(12) United States Patent
Spiropulu et al.

(10) Patent No.: US 12,407,422 B2
(45) Date of Patent: Sep. 2, 2025

(54) TELEPORTATION SYSTEMS TOWARD A QUANTUM INTERNET

(71) Applicant: California Institute of Technology, Pasadena, CA (US)

(72) Inventors: Maria Spiropulu, Pasadena, CA (US); Venkata Ramana Raju Valivarthi, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 18/073,245

(22) Filed: Dec. 1, 2022

(65) Prior Publication Data

US 2024/0275494 A1  Aug. 15, 2024

Related U.S. Application Data

(60) Provisional application No. 63/285,782, filed on Dec. 3, 2021.

(51) Int. Cl.
  *H04B 10/70* (2013.01)
  *H04B 10/079* (2013.01)
  *H04L 7/00* (2006.01)

(52) U.S. Cl.
  CPC ......... *H04B 10/70* (2013.01); *H04B 10/0795* (2013.01); *H04L 7/0075* (2013.01)

(58) Field of Classification Search
  CPC .. H04B 10/70; H04B 10/079; H04B 10/0795; H04B 10/0799; H04B 10/50; H04B 10/60; H04L 7/0075
  See application file for complete search history.

(56) References Cited

U.S. PATENT DOCUMENTS

| | | | |
|---|---|---|---|
| 12,014,246 B2 * | 6/2024 | Bhaskar | G02B 6/1225 |
| 2013/0308956 A1 * | 11/2013 | Meyers | H04B 10/70 |
| | | | 977/933 |

(Continued)

FOREIGN PATENT DOCUMENTS

| | | |
|---|---|---|
| WO | 2019094490 A1 | 5/2019 |
| WO | 2021011765 A1 | 1/2021 |

OTHER PUBLICATIONS

A. Furusawa, J. L. Sørensen, S. L. Braunstein, C. A. Fuchs, H. J. Kimble, and E. S. Polzik, Unconditional Quantum Teleportation, Science (1998).

(Continued)

*Primary Examiner* — Hibret A Woldekidan
(74) *Attorney, Agent, or Firm* — GATES & COOPER LLP

(57) ABSTRACT

Quantum teleportation is essential for many quantum information technologies, including long-distance quantum networks. Using fiber-coupled devices, including state-of-the-art low-noise superconducting nanowire single-photon detectors and off-the-shelf optics, we achieve conditional quantum teleportation of time-bin qubits at the telecommunication wavelength of 1536.5 nm. We measure teleportation fidelities of ≥9% that are consistent with an analytical model of our system, which includes realistic imperfections. To demonstrate the compatibility of our setup with deployed quantum networks, we teleport qubits over 22 km of single-mode fiber while transmitting qubits over an additional 22 km of fiber. Our systems, which are compatible with emerging solid-state quantum devices, provide a realistic foundation for a high-fidelity quantum Internet with practical devices.

20 Claims, 11 Drawing Sheets

(56) References Cited

U.S. PATENT DOCUMENTS

| | | | |
|---|---|---|---|
| 2015/0055961 A1 | 2/2015 | Meyers et al. | |
| 2019/0376820 A1* | 12/2019 | Jones | H04L 9/0852 |
| 2021/0105135 A1* | 4/2021 | Figueroa | H04B 10/70 |
| 2021/0175976 A1 | 6/2021 | Rahman | |
| 2023/0206105 A1* | 6/2023 | Spiropulu | G06N 10/40 706/62 |

OTHER PUBLICATIONS

A. I. Lvovsky, B. C. Sanders, and W. Tittel, Optical quantum memory, Nat. Photonics.

B. Hensen, H. Bernien, A. E. Dréau, A. Reiserer, N. Kalb, M. S. Blok, J. Ruitenberg, R. F. L. Vermeulen, R. N. Schouten, C. Abellán, W. Amaya, V. Pruneri, M. W. Mitchell, M. Markham, D. J. Twitchen, D. Elkouss, S. Wehner, T. H. Taminiau, and R. Hanson, Loophole-free Bell inequality violation using electron spins separated by kilometres, Nature (2015).

B. Korzh, Q.-Y. Zhao, J. P. Allmaras, S. Frasca, T. M. Autry, E. A. Bersin, A. D. Beyer, R. M. Briggs, B. Bumble, M. Colangelo, et al., Demonstration of sub-3 ps temporal resolution with a superconducting nanowire single-photon detector, Nat. Photonics 14, 250 (2020).

B. Lauritzen, J. Minár, H. De Riedmatten, M. Afzelius, N. Sangouard, C. Simon, and N. Gisin, TelecommunicationWavelength Solid-State Memory at the Single Photon Level, Phys. Rev. Lett. 104, 080502 (2010).

B. Yoshida and N. Y. Yao, Disentangling Scrambling and Decoherence via Quantum Teleportation, Phys. Rev. X 9.

C. H. Bennett, G. Brassard, C. Crépeau, R. Jozsa, A. Peres, and W. K. Wootters, Teleporting an unknown quantum state via dual classical and Einstein-Podolsky-Rosen channels, Phys. Rev. Lett. (1993).

C. Simon, Towards a global quantum network, Nat. Photonics 11, 678 (2017).

C. Weedbrook, S. Pirandola, R. García-Patrón, N. J. Cerf, T. C. Ralph, J. H. Shapiro, and S. Lloyd, Gaussian quantum information, Rev. Mod. Phys. 84, 621 (2012).

D. Boschi, S. Branca, F. De Martini, L. Hardy, and S. Popescu, Experimental Realization of Teleporting an Unknown Pure Quantum State via Dual Classical and Einstein-Podolsky-Rosen Channels, Phys. Rev. Lett. 80.

D. Bouwmeester, J.-W. Pan, K. Mattle, M. Eibl, H. Weinfurter, and A. Zeilinger, Experimental quantum teleportation, Nature (1997).

D. Bruss, A. Ekert, and C. Macchiavello, Optimal Universal Quantum Cloning and State Estimation, Phys. Rev. Lett. 81.

D. Gottesman and I. L. Chuang, Demonstrating the viability of universal quantum computation using teleportation and single-qubit operations, Nature 402, 390 (1999).

D. Zhu, M. Colangelo, C. Chen, B. A. Korzh, F. N. Wong, M. D. Shaw, and K. K. Berggren, Resolving Photon Numbers Using a Superconducting Nanowire with ImpedanceMatching Taper, Nano Lett. 20, 3858 (2020).

E. Miyazono, T. Zhong, I. Craiciu, J. M. Kindem, and A. Faraon, Coupling of erbium dopants to yttrium orthosilicate photonic crystal cavities for on-chip optical quantum memories, Appl. Phys. Lett. 108, 011111 (2016).

F. Bussières, C. Clausen, A. Tiranov, B. Korzh, V. B. Verma, S. W. Nam, F. Marsili, A. Ferrier, P. Goldner, H. Herrmann, C. Silberhorn, W. Sohler, M. Afzelius, and N. Gisin, Quantum teleportation from a telecom-wavelength photon to a solid-state quantum memory, Nat. Photonics 8.

F. Marsili, V. B. Verma, J. A. Stern, S. Harrington, A. E. Lita, T. Gerrits, I. Vayshenker, B. Baek, M. D. Shaw, R. P. Mirin, and S. W. Nam, Detecting single infrared photons with system efficiency, Nat. Photonics 7, 210 (2013).Photon spot, Sub-Kelvin Cryogenics & Superconducting Nanowire Single-Photon Detectors, https://www.photon spot.com/.

G. Iskander, N. Sinclair, C. Peña, S. Xie, and M. Spiropulu, Stabilization of an electro-optic modulator for quantum communication using a low-cost microcontroller, Caltech Undergraduate Res. J. 20 (2019).

H. De Riedmatten, I. Marcikic, W. Tittel, H. Zbinden, D. Collins, and N. Gisin, Long Distance Quantum Teleportation in a Quantum Relay Configuration, Phys. Rev. Lett. 92, 047904 (2004).

H. J. Kimble, The quantum internet, Nature.

H. Krovi, S. Guha, Z. Dutton, J. A. Slater, C. Simon, and W. Tittel, Practical quantum repeaters with parametric downconversion sources, Appl. Phys. B 122, 52 (2016).

H. P. Specht, C. Nölleke, A. Reiserer, M. Uphoff, E. Figueroa, S. Ritter, and G. Rempe, A single-atom quantum memory, Nature 473, 190 (2011).

H. Takesue and B. Miquel, Entanglement swapping using telecom-band photons generated in fibers, Opt. Express 17.

H. Takesue, band Hong-Ou-Mandel experiment using photon pairs generated in two independent dispersion shifted fibers, Appl. Phys. Lett. 90, 204101 (2007).

H. Takesue, S. D. Dyer, M. J. Stevens, V. Verma, R. P. Mirin, and S. W. Nam, Quantum teleportation over of fiber using highly efficient superconducting nanowire single-photon detectors, Optica 2, 832 (2015).

H.-J. Briegel, W. Dür, J. I. Cirac, and P. Zoller, Quantum Repeaters: The Role of Imperfect Local Operations in Quantum Communication, Phys. Rev. Lett. 81, 5932 (1998).

I. Marcikic, H. De Riedmatten, W. Tittel, H. Zbinden, and N. Gisin, Long-distance teleportation of qubits at telecommunication wavelengths, Nature.

I. Marcikic, H. de Riedmatten, W. Tittel, V. Scarani, H. Zbinden, and N. Gisin, Time-bin entangled qubits for quantum communication created by femtosecond pulses, Phys. Rev. A 66, 062308 (2002).

J. B. Altepeter, E. R. Jeffrey, and P. G. Kwiat, Photonic State Tomography, Adv. At., Mol., Opt. Phys. 52, 105 (2005).

J. Brendel, N. Gisin, W. Tittel, and H. Zbinden, Pulsed Energy-Time Entangled Twin-Photon Source for Quantum Communication, Phys. Rev. Lett. 82, 2594 (1999).

J. Dias and T. C. Ralph, Quantum repeaters using continuous-variable teleportation, Phys. Rev. A 95,022312 (2017).

J. F. Clauser, M. A. Horne, A. Shimony, and R. A. Holt, Proposed Experiment to Test Local Hidden-Variable Theories, Phys. Rev. Lett. 23,880 (1969).

J. Yin, J.-G. Ren, H. Lu, Y. Cao, H.-L. Yong, Y.-P. Wu, C. Liu, S.-K. Liao, F. Zhou, Y. Jiang, et al., Quantum teleportation and entanglement distribution over 100-kilometre free-space channels, Nature 488, 185 (2012).

J.-G. Ren, P. Xu, H.-L. Yong, L. Zhang, S.-K. Liao, J. Yin, W.-Y. Liu, W.-Q. Cai, M. Yang, L. Li, et al., Ground-tosatellite quantum teleportation, Nature (2017).

K. A. Landsman, C. Figgatt, T. Schuster, N. M. Linke, B. Yoshida, N. Y. Yao, and C. Monroe, Verified quantum information scrambling, Nature 567, 61 (2019).

L. K. Shalm et al., Strong Loophole-Free Test of Local Realism, Phys. Rev. Lett. 115, 250402 (2015).

L. Mandel and E. Wolf, Optical Coherence and Quantum Optics, Optical Coherence and Quantum Optics (Cambridge University Press, Cambridge, 1995 ).

M. A. Nielsen and I. L. Chuang, Quantum Computation and Quantum Information (Cambridge University Press, USA, 2011), 10th ed.

M. Aspelmeyer, T. J. Kippenberg, and F. Marquardt, Cavity optomechanics, Rev. Mod. Phys. 86, 1391 (2014).

M. Giustina et al., Significant-Loophole-Free Test of Bell's Theorem with Entangled Photons, Phys. Rev. Lett. 115.

M. Halder, A. Beveratos, N. Gisin, V. Scarani, C. Simon, and H. Zbinden, Entangling independent photons by time measurement, Nat. Phys. 3, 692 (2007).

M. K. Bhaskar, R. Riedinger, B. Machielse, D. S. Levonian, C. T. Nguyen, E. N. Knall, H. Park, D. Englund, M. Lončar, D. D. Sukachev, and M. D. Lukin, Experimental demonstration of memory-enhanced quantum communication, Nature (2020).

(56) References Cited

OTHER PUBLICATIONS

M. Lucamarini, Z. L. Yuan, J. F. Dynes, and A. J. Shields, Overcoming the rate-distance limit of quantum key distribution without quantum repeaters, Nature (2018).
M. Takeoka, R.-B. Jin, and M. Sasaki, Full analysis of multi-photon pair effects in spontaneous parametric down conversion based photonic quantum information processing, New J. Phys. 17, 043030 (2015).
N. Gisin and R. Thew, Quantum communication, Nat. Photonics 1, 165 (2007).
N. J. Lambert, A. Rueda, F. Sedlmeir, and H. G. Schwefel, Coherent Conversion Between Microwave and Optical Photons—An Overview of Physical Implementations, Adv. Quantum Technol. 3, 1900077 (2020).
N. Lauk, N. Sinclair, S. Barzanjeh, J. P. Covey, M. Saffman, M. Spiropulu, and C. Simon, Perspectives on quantum transduction, Quantum Sci. Technol. 5, 020501 (2020).
N. Lütkenhaus, J. Calsamiglia, and K.-A. Suominen, Bell measurements for teleportation, Phys. Rev. A 59, 3295 (1999).
N. Sangouard, C. Simon, H. De Riedmatten, and N. Gisin, Quantum repeaters based on atomic ensembles and linear optics, Rev. Mod. Phys. 83, 33 (2011).
N. Sinclair, E. Saglamyurek, H. Mallahzadeh, J. A. Slater, M. George, R. Ricken, M. P. Hedges, D. Oblak, C. Simon, W. Sohler, and W. Tittel, Spectral Multiplexing for Scalable Quantum Photonics using an Atomic Frequency Comb Quantum Memory and Feed-Forward Control, Phys. Rev. Lett. 113, 053603 (2014).
PCT International Search Report and Written Opinion dated Jul. 31, 2024 for PCT Application No. PCT/US2022/051543.
O. Landry, J. A. W. van Houwelingen, A. Beveratos, H. Zbinden, and N. Gisin, Quantum teleportation over the Swisscom telecommunication network, JOSA B 24, 398 (2007).
P. Gao and D. L. Jafferis, A Traversable Wormhole Teleportation Protocol in the SYK Model, arXiv:1911.07416 [hep-th] (2019).
P. Gao, D. L. Jafferis, and A. C. Wall, Traversable wormholes via a double trace deformation, J. High Energy Phys. 2017, 151 (2017).
P. J. Mosley, J. S. Lundeen, B. J. Smith, P. Wasylczyk, A. B. U'Ren, C. Silberhorn, and I. A. Walmsley, Heralded Generation of Ultrafast Single Photons in Pure Quantum States, Phys. Rev. Lett. 100, 133601 (2008).
P.-Y. Hou, Y.-Y. Huang, X.-X. Yuan, X.-Y. Chang, C. Zu, L. He, and L.-M. Duan, Quantum teleportation from light beams to vibrational states of a macroscopic diamond, Nat. Commun. 7, 11736 (2016).
Q.-C. Sun, Y.-L. Mao, S.-J. Chen, W. Zhang, Y.-F. Jiang, Y.-B. Zhang, W.-J. Zhang, S. Miki, T. Yamashita, H. Terai, X. Jiang, T.-Y. Chen, L.-X. You, X.-F. Chen, Z. Wang, J.-Y. Fan, Q. Zhang, and J.-W. Pan, Quantum teleportation with independent sources and prior entanglement distribution over a network, Nat. Photonics.
Q.-C. Sun, Y.-L. Mao, Y.-F. Jiang, Q. Zhao, S.-J. Chen, W. Zhang, W.-J. Zhang, X. Jiang, T.-Y. Chen, L.-X. You, L. Li, Y.-D. Huang, X.-F. Chen, Z. Wang, X. Ma, Q. Zhang, and J.-W. Pan, Entanglement swapping with independent sources over an optical-fiber network, Phys. Rev. A 95, 032306 (2017).
R. F. Werner, Quantum states with Einstein-PodolskyRosen correlations admitting a hidden-variable model, Phys. Rev. A 40, 4277 (1989).
R. M. Rassoul, A. Ivanov, E. Freysz, A. Ducasse, and F. Hache, Second-harmonic generation under phase-velocity and group-velocity mismatch: influence of cascading self-phase and cross-phase modulation, Opt. Lett. 22, 268 (1997).
R. Valivarthi, I. Lucio-Martinez, A. Rubenok, P. Chan, F. Marsili, V. B. Verma, M. D. Shaw, J. A. Stern, J. A. Slater, D. Oblak, S. W. Nam, and W. Tittel, Efficient Bell state analyzer for time-bin qubits with fast-recovery WSi superconducting single photon detectors, Opt. Express 22, 24497 (2014).
R. Valivarthi, M. G. Puigibert, Q. Zhou, G. H. Aguilar, V. B. Verma, F. Marsili, M. D. Shaw, S. W. Nam, D. Oblak, and W. Tittel, Quantum teleportation across a metropolitan fibre network, Nat. Photonics 10, 676 (2016).
R. Valivarthi, Q. Zhou, C. John, F. Marsili, V. B. Verma, M. D. Shaw, S. W. Nam, D. Oblak, and W. Tittel, A costeffective measurement-device-independent quantum key distribution system for quantum networks, Quantum Sci. Technol. 2, 04LT01 (2017).
Rarity, Interference of Single Photons from Separate Sources, Ann. N. Y. Acad. Sci. 755, 624 (1995).
S. L. Braunstein and S. Pirandola, Side-Channel-Free Quantum Key Distribution, Phys. Rev. Lett. 108, 130502 (2012).
S. Lloyd, L. Maccone, R. Garcia-Patron, V. Giovannetti, Y. Shikano, S. Pirandola, L. A. Rozema, A. Darabi, Y. Soudagar, L. K. Shalm, and A. M. Steinberg, Closed Timelike Curves via Postselection: Theory and Experimental Test of Consistency, Phys. Rev. Lett. 106, 040403 (2011).
S. Massar and S. Popescu, Optimal Extraction of Information from Finite Quantum Ensembles, Phys. Rev. Lett.
S. Pirandola, J. Eisert, C. Weedbrook, A. Furusawa, and S. L. Braunstein, Advances in quantum teleportation, Nat. Photonics.
S. Wehner, D. Elkouss, and R. Hanson, Quantum internet: A vision for the road ahead, Science 362, eaam9288 (2018).
S. Welinski, P. J. T. Woodburn, N. Lauk, R. L. Cone, C. Simon, P. Goldner, and C. W. Thiel, Electron Spin Coherence in Optically Excited States of Rare-Earth Ions for Microwave to Optical Quantum Transducers, Phys. Rev. Lett. 122, 247401 (2019).
S.-K. Liao, Long-distance free-space quantum key distribution in daylight towards inter-satellite communication, Nat. Photonics 11, 509 (2017).
T. Herbst, T. Scheidl, M. Fink, J. Handsteiner, B. Wittmann, R. Ursin, and A. Zeilinger, Teleportation of entanglement over , Proc. Natl. Acad. Sci. 112, 14202 (2015).
T. Zhong and F. N. Wong, Nonlocal cancellation of dispersion in Franson interferometry, Phys. Rev. A 88, 020103 (2013).
Teleportation Systems Towards a Quantum Internet. PRX Quantum 1, 020317 (2020), https://journals.aps.org/prxquantum/abstract/10.1103/PRXQuantum.1.020317.
V. B. Braginsky and F. Y. Khalili, Quantum non-demolition measurements: the route from toys to tools, Rev. Mod. Phys. (1996).
W. Rosenfeld, D. Burchardt, R. Garthoff, K. Redeker, N. Ortegel, M. Rau, and H. Weinfurter, Event-Ready Bell Test Using Entangled Atoms Simultaneously Closing Detection and Locality Loopholes, Phys. Rev. Lett. 119, 010402 (2017).
X. Ma, B. Qi, Y. Zhao, and H.-K. Lo, Practical decoy state for quantum key distribution, Phys. Rev. A 72, 012326 (2005).
X.-S. Ma, T. Herbst, T. Scheidl, D. Wang, S. Kropatschek, W. Naylor, B. Wittmann, A. Mech, J. Kofler, E. Anisimova, et al., Quantum teleportation over 143 kilometres using active feed-forward, Nature 489, 269 (2012).
X.-X. Xia, Q.-C. Sun, Q. Zhang, and J.-W. Pan, Long distance quantum teleportation, Quantum Sci. Technol. 3, 014012 (2017).
R. Valivarthi et al., "Picosecond Synchronization System for Quantum Networks," in Journal of Lightwave Technology, 2022, doi: 10.1109/JLT.2022.3194860; https://arxiv.org/pdf/2203.03127.pdf; arXiv:2203.03127 [quantph] (or arXiv:2203.03127v1 [quant-ph] for this version) https://doi.org/10.48550/arXiv.2203.03127.
T. D. Ladd, F. Jelezko, R. Laflamme, Y. Nakamura, C. Monroe, and J. L. O'Brien, Quantum computers, Nature (2010).
C. K. Hong, Z. Y. Ou, and L. Mandel, Measurement of subpicosecond time intervals between two photons by interference, Phys. Rev. Lett. 59, 2044 (1987).
V. Bužek and M. Hillery, Quantum copying: Beyond the no-cloning theorem, Phys. Rev. A 54, 1844 (1996).

\* cited by examiner

TELEPORTATION SYSTEMS TOWARD A QUANTUM INTERNET

CROSS REFERENCE TO RELATED APPLICATIONS

This application claims the benefit under 35 USC 119(e) of and commonly assigned U.S. Provisional Patent Application Ser. No. 63/285,782, filed Dec. 3, 2021, by Maria Spiropulu and Venkata Ramana Raju Valivarthi, entitled "TELEPORTATION SYSTEMS TOWARD A QUANTUM INTERNET," (CIT-8635), which application is incorporated by reference herein.

STATEMENT REGARDING FEDERALLY SPONSORED RESEARCH AND DEVELOPMENT

This invention was made with government support under Grant No. DE-SC0019219 and DE-SC0020376 awarded by US Department of Energy. The government has certain rights in the invention.

BACKGROUND OF THE INVENTION

1. Field of the Invention

The present invention relates to quantum teleportation systems and methods of making the same.

2. Description of the Related Art

A goal of a quantum network is to distribute quantum information between different locations, a key task for quantum cryptography, distributed quantum computing, and sensing. A quantum network is expected to form part of a future quantum Internet [20-22]; a globally distributed set of quantum processors, sensors, or users thereof that are mutually connected over a network capable of allocating quantum resources (e.g., qubits and entangled states) between locations. Many architectures for quantum networks require quantum teleportation protocols, such as star-type networks that distribute entanglement from a central location or quantum repeaters that overcome the error trade-off of direct transmission of quantum information [19, 23-26].

Quantum teleportation of a qubit can be achieved by performing a Bell-state measurement (BSM) between the qubit and another that forms one member of an entangled Bell state [1, 18, 27]. The quality of the teleportation is often characterized by the fidelity $F=\langle\psi|\rho|\psi\rangle$ of the teleported state $\rho$ with respect to the state $|\psi\rangle$ accomplished by ideal generation and teleportation [15]. This metric is becoming increasingly important as quantum networks move beyond specific applications, such as quantum key distribution, and toward the quantum Internet.

Polarization qubits have been preferred for demonstrations of quantum teleportation over free-space channels [23-30], including the recent ground-to-satellite quantum teleportation [31], because of their ease of preparation and measurement, as well as the lack of polarization rotation in free space. Qubits encoded by the time of arrival of individual photons, i.e., time-bin qubits [32], are useful for fiber networks due to their simplicity of generation, interfacing with quantum devices, as well as the independence of dynamic polarization transformations of real world fibers. Individual telecom-band photons (around 1.5 µm wavelength) are ideal carriers of qubits in networks due to their ability to rapidly travel over long distances in deployed optical fibers [17, 33-35] or atmospheric channels [36], among other properties. Moreover, the improvement and growing availability of sources and detectors of individual telecom-band photons has accelerated progress toward workable quantum networks and associated technologies, such as quantum memories [37], transducers [33, 39], or quantum nondestructive measurement devices [40].

Teleportation of telecom-band photonic time-bin qubits has been performed inside and outside the laboratory, with impressive results [33-35, 41-46]. Despite this, there has been little work to increase F beyond approximately 90% for these qubits, in particular using practical devices that allow straightforward replication and deployment of quantum networks (e.g., using fiber-coupled and commercially available devices). Moreover, it is desirable to develop teleportation systems that are forward compatible with emerging quantum devices for the quantum Internet.

SUMMARY OF THE INVENTION

Example systems and method according to the present invention include, but are not limited to, the following.

1. A quantum teleportation system, comprising:
   a transmitter generating first photons;
   a source of pairs of entangled photons, each pair comprising a second photon entangled with a third photon;
   a coupler electromagnetically coupled to the transmitter and the source of pairs of entangled photons;
   a pair of detectors D1 and D2 electromagnetically coupled to the coupler;
   a receiver including a detection system comprising a detector D3 detecting the third photons;
   an optical fiber connecting the detector D3 and the source of pairs of entangled photons, wherein the detector D3 detects the third photons transmitted along the optical fiber;
   a clock distribution system outputting one or more clock signals controlling timing of the first photons, the second photons, and the third photons such that:
      the coupler interacts one of the first photons, carrying a first qubit, and one of the second photons, carrying a second qubit, to form an interference;
      the pair of detectors D1 and D2 detect the interference used to obtain a Bell State Measurement of a quantum system comprising the first qubit and the second qubit;
      the detector D3 detects one of the third photons entangled with the one of the second photons and outputs a signal in response thereto; and
      the detection system reads a state of the first qubit using the signal and the Bell State Measurement;
   a data acquisition system acquiring arrival times of the first photons and the second photons at the detectors D1 and D2, and the arrival times of the third photons at the detector D3, wherein the arrival times are tagged with reference to the clock signals so that one or more sets of photons may be identified, each set comprising the one of the first photons, the one of the second photons, and the one of the third photons; and
   a computer benchmarking the quantum teleportation system in real time using the arrival times, wherein the benchmarking comprises using a model simulating at least one of teleportation fidelity of the first qubit teleported to the one of the third photons received at the detector D3, or a degree of indistinguishability between the one of the first photons and the one of the second photons, as a function of a mean number of the second photons, wherein the model is calibrated and validated using experimental measurements of the teleportation fidelity and the degree of indistinguishability 2. The system of example 1, wherein:
the transmitter generates pulses of electromagnetic radiation each comprising one or more of the first photons,
the system further comprises:
a first attenuator attenuating the pulses of electromagnetic radiation so as to output attenuated pulses each comprising a first mean number of the first photons, the first mean number of the first photons received on the coupler increasing a likelihood the coupler interacts a single one of the first photons with a single one of the second photons to form the interference;
a first filter electromagnetically coupled to the coupler and spectrally filtering the electromagnetic radiation so as to increase indistinguishability between the one of the first photons and the one of the second photons;
one or more second filters electromagnetically coupled to the source of pairs of entangled photons and spectrally filtering the entangled photons;
the first qubit and the second qubit each comprise a time bin qubit comprising a superposition of an early photon with a later arriving photon; and
the source of entangled photons comprises a laser pumping a nonlinear material so as to output the second photons comprising idler photons and the third photons comprising signal photons according to a spontaneous parametric down conversion (SPDC) process.

3. The system of example 1, wherein the benchmarking comprises determining at least one of a teleportation fidelity of the first qubit teleported to the one of the third photons received at D3, the degree of indistinguishability between the one of the first photons and the one of the second photons, or a threefold coincidence photon detection rate of one of the photons being coincidentally detected at each of D1, D2, and D2.

4. The system of example 1, wherein the coupler comprises a beamsplitter or a linear optical device capable of interfering photons or electromagnetic fields.

5. The system of example 1, wherein:
the first qubit and the second qubit each comprise a time bin qubit comprising a superposition of an early photon with a later arriving photon;
the source of entangled photons comprises a laser pumping a nonlinear material so as to output the one of the second photons comprising an idler photon and the one of the third photons comprising a signal photon according to a spontaneous parametric down conversion (SPDC) process;
the clock signals comprise clock cycles;
the data acquisition system measures a mean number of the second photons by comparing:
a coincidence rate, comprising events wherein the one of the second photons and
the one of the third photons in the one of the pairs of entangled photons are detected in a same one of the clock cycles; and
an accidental rate, comprising events wherein the one of the second photons and
the one of the third photons in the one of the pairs of entangled photons are detected in different clock cycles, the degree of indistinguishability is measured by performing a Hong-Ou-Mandel experiment observing the interference using the coupler comprising a beamsplitter; and
the teleportation fidelity is measured using an interferometer measuring visibility of interference of the third photon with itself.

6. The system of example 5, wherein the model computes the teleportation fidelity and the degree of indistinguishability by:
determining a probability $P_{3f}$ of a threefold coincidence detection of one of the photons on each of the detectors D1, D2 and D3

$$P_{3f} = Tr\left\{\rho_{AB}\left(1 - (|0\rangle\langle 0|)^{\otimes 3}_{\hat{a}_1,\hat{a}_2,\hat{a}_3}\right) \otimes \left(1 - (|0\rangle\langle 0|)^{\otimes 3}_{\hat{b}_1,\hat{b}_2,\hat{b}_3}\right) \otimes (1 - (|0\rangle\langle 0|)_{\hat{c}})\right\}$$

where:
$\hat{a}$ and $\hat{b}$ operators represent modes of the one of the first photons and the one of the second photons, respectively, that are indistinguishable,
$\hat{c}$ represents a mode of the one of the third photons directed on the detector $D_3$, and $$\rho_{AB} = (|\alpha\rangle\langle\alpha|) \otimes (|\Psi_{TMSV}\rangle\langle\Psi_{TMSV}|)$$

represents a quantum state of the quantum system;

determining the amount of indistinguishability $V_{HOM}(\zeta)=[P_{3f}(0)-P_{3f}(\zeta)]/P_{3f}(0)$
where $\zeta$ is an amount of indistinguishability between the first qubit and the second qubit, such that $\zeta=1$ ($\zeta=0$) corresponds to a case when both the first qubit and the second qubit are perfectly indistinguishable (distinguishable); and determining the teleportation fidelity $F(\zeta)=P_{3f}(\zeta,\varphi_{max})/[P_{3f}(\zeta,\varphi_{max})+P_{3f}(\zeta,\varphi_{min})]$, where $\varphi_{max}$ ($\varphi_{min}$) is a maximum (minimum) phase added into a path of the one of the second photons, corresponding to a maximum (minimum) rate of the threefold coincidence detection.

7. The system of example 6, wherein:

$$1.\ P_{3f}(\zeta) = 1 - 2\frac{\exp\left(-\frac{(\mu_A/2)[1+(1-\zeta^2)\eta_i\mu_B/2]}{1+\eta_i\mu_B/2}\right)}{1+\eta_i\mu_B/2} -$$

$$\frac{1}{1+\eta_s\mu_B} + \frac{\exp(-\mu_A)}{1+\eta_i\mu_B} - \frac{\exp(-\mu_A)}{1+(1-\eta_s)\eta_i\mu_B+\eta_s\mu_B} +$$

$$2\frac{\exp\left(-\frac{(\mu_A/2)[1+(1-\zeta^2)(1-\eta_s)\eta_i\mu_B/2+\eta_s\mu_B]}{1+(1-\eta_s)\eta_i\mu_B/2+\eta_s\mu_B}\right)}{1+(1-\eta_s)\eta_i\mu_B/2+\eta_s\mu_B}$$

where $\eta_i$ and $\eta_s$ are the transmission efficiencies of the second photons and the third photons, respectively, including the detector efficiencies, $\mu_A$ is the mean number of the first photons per time bin, and $\mu_B$ is the mean number of second photons per time bin.

8. The system of example 7, wherein:
the first qubit comprises a first time bin qubit and the second qubit comprises a second time bin qubit,
the clock signal comprises clock cycles;

the data acquisition system acquires:
   a coincidence rate, comprising events wherein the one of the second photons and
   the one of the third photons in the one of the pairs of entangled photons are detected in a same one of the clock cycles;
   an accidental rate, comprising events wherein the one of the second photons and
   the one of the third photons in the one of the pairs of entangled photons are detected in different clock cycles;
   a first detection rate of the second photons; and
   a second detection rate of the third photons;
   $\eta_i$ is the second detection rate divided by the coincidence rate and $\eta_s$ is the first detection rate divided by the coincidence rate; and
   the mean number of the second photons per time bin is the accidental rate divided by the coincidence rate.

9. The system of example 4, wherein the model calculates a probability of the detectors D1, D2, and D3 receiving one of the first photons, one of the second photons and one of the third photons in a same clock cycle, using a fitting parameter comprising a transmittance representing the amount of indistinguishability.

10. The system of example 2, wherein the computer uses the benchmarking to output feedback used to optimize at least one of the timing, an intensity of the entangled photons outputted from the source of entangled photons, the spectral filtering of the photons, or an amount of attenuation of the pulses of electromagnetic radiation, so as to achieve the teleportation fidelity greater than 0.90 when the third photons travel a distance of at least 22 kilometers along the optical fiber.

11. The system of example 1, further comprising a display displaying the benchmarking.

12. A method of teleporting using a quantum teleportation system, comprising: teleporting a first qubit, comprising:
   performing a Bell State Measurement of a quantum system, comprising interfering one or more first photons, carrying the first qubit, and one or more second photons, carrying a second qubit, wherein the quantum system comprises one of the first photons and one of the second photons;
   detecting one or more third photons, each of the third photons entangled with one of the second photons prior to the interfering;
   reading a state of the first qubit using the Bell State Measurement;
      acquiring arrival times of the first photons and the second photons at detectors D1, D2 used to perform the Bell State Measurement, and the arrival times of the third photons at the receiver, wherein the arrival times are tagged with reference to clock signals so that one or more sets of photons may be identified, each set comprising the one of the first photons, the one of the second photons, and the one of the third photons; and
   benchmarking the quantum teleportation system in real time using the arrival times.

13. A computer implemented system, comprising:
   one or more processors; one or more memories; and an application stored in the one or more memories, the application executed by the one or more processors:
      benchmarking a quantum teleportation system in real time, the quantum teleportation system:
         teleporting a first qubit, comprising:
            performing a Bell State Measurement of a quantum system, comprising
            interfering one or more first photons, carrying the first qubit, and one or more second photons, carrying a second qubit, wherein the quantum system comprises one of the first photons and one of the second photons;
            detecting one or more third photons at a receiver, each of the third photons entangled with one of the second photons prior to the interfering;
         reading a state of the first qubit using the Bell State Measurement; wherein:
         the benchmarking comprises the application:
         receiving arrival times of the first photons and the second photons at detectors D1, D2 used to perform the Bell State Measurement, and the arrival times of the third photons at the receiver, wherein the arrival times are tagged with reference to clock signals so that one or more sets of photons may be identified, each set comprising the one of the first photons, the one of the second photons, and the one of the third photons; and
         using the arrival times to determine at least one of a teleportation fidelity of the first qubit teleported to the one of the third photons received at D3, a degree of indistinguishability between the one of the first photons and the one of the second photons, or a threefold coincidence photon detection rate of one of the photons being coincidentally detected at each of D1, D2, and D2.

14. A computer implemented method, comprising:
   benchmarking a quantum teleportation system in real time, the teleportation system:
      teleporting a first qubit, comprising:
         performing a Bell State Measurement of a quantum system, comprising
         interfering one or more first photons, carrying the first qubit, and one or more second photons, carrying a second qubit, wherein the quantum system comprises one of the first photons and one of the second photons;
         detecting one or more third photons, each of the third photons entangled with one of the second photons prior to the interfering;
      reading a state of the first qubit using the Bell State Measurement; wherein:
      the benchmarking comprises an application:
      acquiring arrival times of the first photons and the second photons at detectors D1, D2 used to perform the Bell State Measurement, and the arrival times of the third photons at the receiver, wherein the arrival times are tagged with reference to clock signals so that one or more sets of photons may be identified, each set comprising the one of the first photons, the one of the second photons, and the one of the third photons; and
      using the arrival times to determine at least one of a teleportation fidelity of the first qubit teleported to the one of the third photons received at a detector D3, a degree of indistinguishability between the one of the first photons and the one of the second photons, or a threefold coincidence photon detection rate of one of the photons being coincidentally detected at each of D1, D2, and D2.

15. The system or method of example 13 or 14, wherein:
   a transmitter generates pulses of electromagnetic radiation each comprising one or more of the first photons, the system further comprises:
a first attenuator attenuating the pulses of electromagnetic radiation so as to output attenuated pulses each comprising a first mean number of the first photons, the first mean number of photons received on a coupler increasing a likelihood the coupler interacts a single one of the first photons with a single one of the second photons to form an interference;
a first filter electromagnetically coupled to the coupler and spectrally filtering the electromagnetic radiation so as to increase indistinguishability between the one of the first photons and the one of the second photons;
one or more second filters electromagnetically coupled to a source of pairs of entangled photons (comprising one of the second photons and one of the third photons) and spectrally filtering the entangled photons;
the first qubit and the second qubit each comprise a time bin qubit comprising a superposition of an early photon with a later arriving photon; and
the source of the pairs of the entangled photons comprises a laser pumping a nonlinear material so as to output the second photons comprising idler photons and the third photons comprising signal photons according to a spontaneous parametric down conversion (SPDC) process.

16. The system or method of example 13 or 14, wherein the benchmarking comprises using a model simulating at least one of teleportation fidelity of the first qubit teleported to the one of the third photons received at the detector D3, or the degree of indistinguishability between the one of the first photons and the one of the second photons, as a function of a mean number of the second photons, wherein the model is calibrated and validated using experimental measurements of the teleportation fidelity and the degree of indistinguishability 17. The method of example 16, wherein the coupler comprises a beamsplitter or a linear optical device capable of interfering photons or electromagnetic fields.

18. The system or method of example 16, wherein:
the first qubit and the second qubit each comprise a time bin qubit comprising a superposition of an early photon with a later arriving photon;
the source of entangled photons comprises a laser pumping a nonlinear material so as to output the one of the second photons comprising an idler photon and the one of the third photons comprising a signal photon according to a spontaneous parametric down conversion (SPDC) process;
the clock signal comprises clock cycles;
the data acquisition system measures a mean number of the second photons by comparing:
a coincidence rate, comprising events wherein the one of the second photons and the one of the third photons in the pair of entangled photons are detected in a same one of the clock cycles; and
an accidental rate, comprising events wherein the one of the second photons and the one of the third photons in the entangled pair are detected in different clock cycles,
the degree of indistinguishability is measured by performing a Hong-Ou-Mandel experiment observing the interference using the coupler comprising a beamsplitter; and
the teleportation fidelity is measured using an interferometer measuring visibility of interference of the third photon with itself.

19. The system or method of example 18, wherein the model computes the teleportation fidelity and the amount of indistinguishability by:
determining a probability $P_{3f}$ of a threefold coincidence detection of one of the photons on each of the detectors D1, D2 and D3:

$$P_{3f} = Tr\left\{\rho_{AB}\left(1 - (|0\rangle\langle 0|)^{\otimes 3}_{\hat{a}_1,\hat{a}_2,\hat{a}_3}\right) \otimes \left(1 - (|0\rangle\langle 0|)^{\otimes 3}_{\hat{b}_1,\hat{b}_2,\hat{b}_3}\right) \otimes (1 - (|0\rangle\langle 0|)_{\hat{c}})\right\}$$

where:
$\hat{a}$ and $\hat{b}$ operators represent modes of the one of the first photons and the one of the second photons, respectively, that are indistinguishable,
$\hat{c}$ represents a mode of the one of the third photons directed on the detector $D_3$, and $$\rho_{AB} = (|\alpha\rangle\langle\alpha|) \otimes (|\Psi_{TMSV}\rangle\langle\Psi_{TMSV}|)$$

represents a quantum state of the quantum system;

determining the amount of indistinguishability $V_{HOM}(\zeta) = [P_{3f}(0) - P_{3f}(\zeta)]/P_{3f}(0)$
where $\zeta$ is an amount of indistinguishability between the first qubit and the second qubit, such that $\zeta=1$ ($\zeta=0$) corresponds to the case when both the first qubit and the second qubit are perfectly indistinguishable (distinguishable); and
determining the teleportation fidelity
$F(\zeta) = P_{3f}(\zeta, \varphi_{max})/[P_{3f}(\zeta, \varphi_{max}) + P_{3f}(\zeta, \varphi_{min})]$, where $\varphi_{max}$ ($\varphi_{min}$) is a maximum (minimum) phase added into a path of the one of the second photons, corresponding to a maximum (minimum) rate of the threefold coincidence detection.

20. The system or method of example 19, wherein:

$$2.\ P_{3f}(\zeta) = 1 - 2\frac{\exp\left(-\frac{(\mu_A/2)[1 + (1-\zeta^2)\eta_i\mu_B/2]}{1 + \eta_i\mu_B/2}\right)}{1 + \eta_i\mu_B/2} - \frac{1}{1 + \eta_s\mu_B} + \frac{\exp(-\mu_A)}{1 + \eta_i\mu_B} - \frac{\exp(-\mu_A)}{1 + (1-\eta_s)\eta_i\mu_B + \eta_s\mu_B} + 2\frac{\exp\left(-\frac{(\mu_A/2)[1 + (1-\zeta^2)(1-\eta_s)\eta_i\mu_B/2 + \eta_s\mu_B]}{1 + (1-\eta_s)\eta_i\mu_B/2 + \eta_s\mu_B}\right)}{1 + (1-\eta_s)\eta_i\mu_B/2 + \eta_s\mu_B}$$

where $\eta_i$ and $\eta_s$ are the transmission efficiencies of the second photons and the third photons, respectively, including the detector efficiencies, $\mu_A$ is the mean number of the first photons per time bin, and $\mu_B$ is the mean number of second photons per time bin.

21. A quantum teleportation of time-bin qubits at telecom wavelengths and with an average fidelity F≥90%. This is accomplished using a compact setup of fiber-coupled devices, including low-dark-count single-photon detectors and off the-shelf optics, allowing reproduction for multi-node networks. To illustrate network compatibility, teleportation is performed with up to 44 km of single mode fiber between the qubit generation and the measurement of the teleported qubit, and is facilitated using semiautonomous control, monitoring, and synchronization systems, with results collected using scalable acquisition hardware. The system, which operates at a clock rate of at least 90 MHz, can be run remotely for several days without interruption and can yield teleportation rates of a few Hertz using the full length of fiber. Our qubits are also compatible with erbium-doped crystals, e.g., Er:Y$_2$SiO$_5$, which are used to develop quantum network devices such as memories and transducers [48-50]. The example 1536.5-nm operating wavelength is within the low-loss (C-band) telecommunication window for long-haul communication and where a variety of off-the-shelf equipment is available. An analytical model of our system, which includes experimental imperfections, predicts that the fidelity can be improved further toward unity by well-understood methods (such as improvement in photon indistinguishability).

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

1. Example Teleportation System

Figure 1:
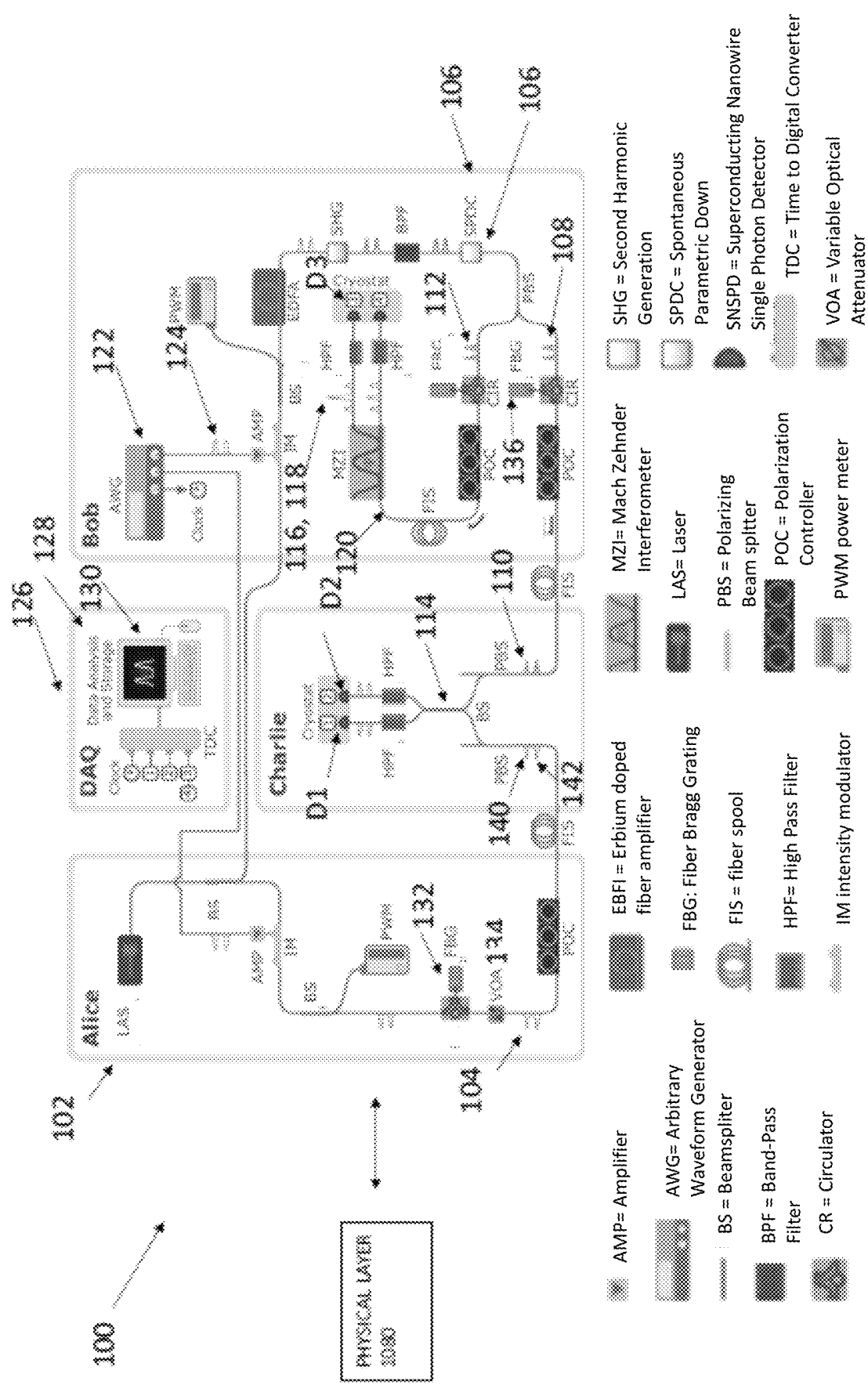
FIG. 1. A schematic diagram of the quantum teleportation system consisting of Alice, Bob, Charlie, and the data acquisition (DAQ) subsystems. See the main text for descriptions of each subsystem. One cryostat is used to house all SNSPDs: it is drawn as two for ease of explanation. The detection signals generated by each of the SNSPDs are labelled 1-4 and collected at the TDC, with 3 and 4 being time multiplexed. All individual components are labeled in the legend, with single-mode optical fibers (electronic cables) in gray (green), and with uni- and bichromatic (i.e., unfiltered) optical pulses indicated.

FIG. 1 summarizes a quantum teleportation system 100 implementing a teleportation protocol in which a photonic qubit (provided by Alice) is interfered with one member of an entangled photon pair (from Bob) and projected (by Charlie) onto a Bell state, whereby the state of Alice's qubit can be transferred to the remaining member of Bob's entangled photon pair. Photons are transmitted using single-mode fiber and all qubits are generated at the clock rate, with all of their measurements collected using a data acquisition (DAQ) system.

FIG. 1 illustrates the quantum teleportation system 100 includes a transmitter 102 generating first photons 104 (carrying a first qubit); a source 106 of pairs 108 of entangled photons, each pair comprising a second photon 110 (carrying a second qubit) entangled with a third photon 112; a coupler 114 electromagnetically coupled to the transmitter and the source of pairs of entangled photons; a pair of detectors D1 and D2 electromagnetically coupled to the coupler; a receiver 116 including a detection system 118 comprising a detector D3 detecting the third photons 112; an optical fiber 120 connecting the detector D3 and the source of pairs of entangled photons, wherein the detector D3 detects the third photons transmitted along the optical fiber;

a clock distribution system 122 outputting one or more clock signals 124 controlling timing of the first photons, the second photons, and the third photons; a data acquisition system 126 acquiring arrival times of the photons; and a computer 128 benchmarking the quantum teleportation system in real time using the arrival times. A display 130 can display the benchmarking. In one or more examples, the first qubit and the second qubit each comprise a time bin qubit comprising a superposition of an early photon 140 with a later arriving photon 142.

Each of the subsystems are further detailed in the following subsections.

a. Alice: Single-Qubit Generation

To generate the time-bin qubit that Alice will teleport to Bob, light from a fiber-coupled telecom wavelength (e.g., 1536.5-nm) continuous wave (cw) laser is input into an intensity modulator (IM). In the example shown, the IM is a lithium niobate intensity modulator. We drive the IM with one pulse, or two pulses separated in time (e.g., separated in time by less than 10 ns, in this example separated in time by 2 ns). Each pulse is of approximately 100 ps or less (in this case 65 ps) full width at half maximum (FWHM) duration. The pulses are produced by an arbitrary-waveform generator (AWG) and amplified by a high-bandwidth amplifier to generate optical pulses that have an extinction ratio. In the example shown, the amplifier has 27-dB-gain and the extinction ratio is up to 22 dB. We note that this method of creating time-bin qubits offers us flexibility not only in terms of choosing a suitable time-bin separation but also for synchronizing qubits originating from different nodes in a network. A polarization-maintaining beam splitter (BS) combined with a power monitor (PWM) is used to apply feedback to the dc-bias port of the IM so as to maintain a constant (e.g., 22 B) extinction ratio [54]. In this example, the BS a polarization maintaining fiber BS maintaining at least 90% of the polarization (a 90:10 polarization maintaining fiber BS). In order to successfully execute the quantum teleportation protocol, photons from Alice and Bob must be indistinguishable in all degrees of freedom. Hence, the optical pulses at the output of the IM are band-pass filtered in a filter 132 (see FIG. 1), e.g., using a fiber Bragg grating (FBG), to match the spectrum of the photons from the entangled pair source (Bob). In the example shown the FBG has a 2-GHz-bandwidth (FWHM) centered at the wavelength of the photons (in this case, 1536.5 nm). Furthermore, the polarization of Alice's photons is determined by a manual polarization controller (POC) in conjunction with a polarizing beam splitter (PBS) at Charlie. Finally, the optical pulses from Alice are attenuated to the single-photon level by an attenuator (134 in FIG. 1, e.g., variable optical attenuator (VOA)), to approximate photonic time-bin qubits of the form $|A\rangle = \gamma|e\rangle_A + \sqrt{1-\gamma^2}|l\rangle_A$, where the late state $|l\rangle_A$ arrives (in this example, 2 ns) after the early state $|e\rangle_A$ and $\gamma$ is real and set to be either 1, 0, or $1/\sqrt{2}$ to generate $|e\rangle_A$, $|l\rangle_A$, or $|+\rangle_A = (|e\rangle_A + |l\rangle_A)/\sqrt{2}$, respectively, depending on the experiment. The complex relative phase is absorbed into the definition of $|l\rangle_A$. The duration of each time bin can be less than 1000 ps, and in this case is 800 ps.

b. Bob: Entangled Qubit Generation and Teleported-Qubit Measurement

Similar to Alice, one (two) telecom wavelength optical pulse(s) with a FWHM (e.g., less than 100 ps) having the same wavelength as Alice's pulses are created using a CW laser in conjunction with an IM driven by an AWG, a BS, and a PWM. In this example, the optical pulses have a wavelength of 1536.5 nm, the FWHM of the optical pulses is approximately 65 ps, the pulses are separated by 2 ns, the IM is a lithium niobate IM, the BS is a 90:10 BS and the PWM maintains an extinction ratio of at least 20 dB. An amplifier (in this example, an erbium-doped fiber amplifier (EDFA)) is used after the IM to boost the pulse power and thus maintain a high output rate of photon pairs.

In the example shown, the output of the EDFA is sent to a type-0 periodically poled lithium niobate (PPLN) waveguide for second harmonic generation (SHG), up-converting the pulses to 763.25 nm. The residual light at 15365 nm is removed by a 763-nm band-pass filter with an extinction ratio ≥80 dB. These pulses undergo spontaneous parametric down conversion (SPDC) using a type-II PPLN waveguide coupled to a polarization-maintaining fiber (PMF) to produce either the photon pair|pair$\rangle_B = |ee\rangle_B$ or the time-bin entangled state $|\phi^+\rangle_B = (|ee\rangle_B + |ll\rangle_B)/\sqrt{2}$, if one or two pulses, respectively, are used to drive the IM.

The ordering of the states refers to so-called signal and idler modes of the pair of which the former has parallel, and the latter orthogonal, polarization with respect to the axis of the PMF. As discussed above, the relative phase is absorbed into the definition of $|ll\rangle_B$. Each photon is separated into different fibers using a PBS and spectrally filtered with FBGs akin to that at Alice. Note that the bandwidth of the FBG is chosen as a trade-off between spectral purity and the generation rate of Bob's photons [55].

The photon in the idler mode is sent to Charlie for teleportation or HOM measurements or to a (e.g., Mach-Zehnder interferometer (MZI)) for characterizations of the entangled state, with its polarization determined using a POC (for example). The photon in the signal mode is sent to a MZI by way of a POC (and an additional, in one or more examples, 11 km of single-mode fiber for some measurements) and is detected by a low dark count single photon detector. In the example illustrated herein, the single photon detectors comprise superconducting nanowire single-photon detectors (SNSPDs) [56] after high-pass filtering (HPF) to reject any remaining 768.25-nm light. The MZI and detectors are used for projection measurements of the teleported state, characterization of the time-bin entangled state, or measuring HOM interference at Charlie. The time of arrival of the photons is recorded by the DAQ subsystem using a time-to-digital converter (TDC) referenced to the clock signal from the AWG.

All SNSPDs are installed in a compact-sorption fridge cryostat [57], which operates at a temperature of 0.8 K for typically 24 h before a required 2-h downtime. Our SNSPDs are developed by the Applicant and have detection efficiencies between 76 and 85%, with low dark-count rates of 2-3 Hz. The FWHM temporal resolution of all detectors is between 60 and 90 ps, while their recovery time is approximately 50 ns.

The MZI has a path-length difference equal to the time separation of the time-bin photons (in this case, 2 ns) and is used to perform projection measurements of $|e\rangle_B$, $|l\rangle_B$, and $(|e\rangle_B + e^{i\varphi}|l\rangle_B)/\sqrt{2}$, by detecting photons at three distinct arrival times in one of the outputs and varying the relative phase $\varphi$ [32]. Detection at the other output yields the same measurements except with a relative phase of $\varphi + \pi$. In one or more embodiments, we use a custom temperature-feedback system to slowly vary $\varphi$ for up to 15-h time intervals to collect all measurements, which is within the cryostat hold time.

c. Charlie: Bell-State Measurement

Charlie consists of a 50:50 polarization-maintaining fiber BS, with relevant photons from the Alice and Bob subsystems directed to each of its inputs via a PBSs and optical fiber. The photons are detected at each output with a single photon detector (SNSPD) after HPFs, with their arrival times recorded using the DAQ, as was done at Bob. Teleportation is facilitated by measurement of the $|\Psi^-\rangle_{AB}=(|e l\rangle_{AB}-|l e\rangle_{AB})/\sqrt{2}$. Bell state, which corresponds to the detection of a photon in $|e\rangle$ at one detector followed by the detection of a photon in $|l\rangle$ at the other detector after Alice and Bob's (indistinguishable) qubits arrive at the BS [58]. Projection on the $|\Psi^-\rangle_{AB}$ state corresponds to teleportation of $|A\rangle$ up to a known local unitary transformation, i.e., our system produces $-i\sigma_y|A\rangle$, with $\sigma_y$ being the Pauli y matrix.

d. Control Systems and Data Acquisition

Our system is built with a vision toward future replicability, with a particular emphasis on systems integration. Each of the Alice, Bob, and Charlie subsystems is equipped with monitoring and active-feedback stabilization systems (e.g., for the IM extinction ratio) or has a capability for remote control of the critical network parameters (e.g., varying the qubit generation time). Each subsystem has a central classical processing unit with the following functions: oversight of automated functions and workflows within the subsystem, data acquisition and management, and handling of input and output synchronization streams. As the quantum information is encoded in the time domain, the correct operation of the classical processing unit depends critically on the recorded time of arrival of the photons at the SNSPDs. Thus a significant effort is dedicated to building a robust DAQ subsystem capable of recording and processing the large volumes of time-tagged signals generated by the SNSPDs and recorded by our TDCs at a high rate. The DAQ is designed to enable both real-time data analysis for prompt data quality monitoring as well as postprocessing data analysis that allows us to achieve the best understanding of the data.

In the example presented herein, the DAQ system is built on top of the stand-alone Linux library of our commercial TDC. It records time tags whenever a signal is detected in any channel in coincidence with the reference (in this example, 90-MHz) clock. The time tags are streamed to a computer, where they are processed in real-time and stored to disk for future analysis. A graphical user interface is developed, capable of real-time visualization and monitoring of photons detected while executing teleportation. It also allows for easy control of the time intervals used for each channel and configuration of the relevant coincidences between the different photon detection events across all TDC channels. We expect our DAQ subsystem to serve as the foundation for future real-world time-bin quantum networking experiments and applications (see Sec. 8).

e. Example Low Dark Count Single Photon Detectors: Superconducting Nanowire Single-Photon Detectors In the example presented herein, the low dark count single photon detectors comprise amorphous tungsten silicide SNSPDs manufactured in the JPL Microdevices Laboratory for all measurements at the single-photon level [56]. The entire detection system is customized for optimum autonomous operation in a quantum network. The SNSPDs are operated at 0.8 K in a closed-cycle sorption fridge [57]. The detectors have nanowire widths between 140 and 160 nm and are biased at a current of 8-9 µA. The FWHM timing jitter (i.e., temporal resolution) for all detectors is between 60 and 90 ps (measured using a Becker & Hickl SPC-150NXX time-tagging module). The system detection efficiencies (as measured from the fiber bulkhead of the cryostat) are between 76 and 85%. The SNSPDs feature low dark-count rates between 2 and 3 Hz, achieved by short-pass filtering of background black-body radiation through coiling of optical fiber to a 3-cm diameter within the 40-K cryogenic environment, and an additional band-pass filter coating deposited on the detector fiber pigtails (by Andover Corporation). Biasing of the SNSPDs is facilitated by cryogenic bias tees with inductive shunts to prevent latching, thus enabling uninterrupted operation. The detection signals are amplified using Mini-Circuits ZX60-P103LN+ and ZFL-1000LN+ amplifiers at room temperature, achieving a total noise figure of 0.61 dB and a gain of 39 dB at 1 GHz, which enables the low system jitter. Note that FWHM jitter as low as 45 ps is achievable with the system, by biasing the detectors at approximately 10 µA, at the cost of an elevated DCR on the order of 30 cps. Using commercially available components, the system is readily scalable to as many as 64 channels per cryostat, ideal for star-type quantum networks, with uninterrupted 24/7 operation. The bulkiest component of the current system is an external helium compressor; however, compact rack-mountable versions are readily available [57].

f. Example Interferometer and Phase Stabilization

In the examples presented herein, we use a commercial Kylia 04906-MINT MZI, which is constructed of free-space devices (e.g., mirrors and BSs) with a small form factor that fits into a handheld box. Light is coupled into and out of the MZI using polarization maintaining fiber, with a loss of approximately 2.5 dB. The interferometer features an average visibility of 98.5% that is determined by directing $|+\rangle$ with $\mu_A=0.07$ into one of the input ports, measuring the fringe visibility on each of the outputs using an SNSPD. The relative phase $\varphi$ is controlled by a voltage-driven heater that introduces a small change in refractive index in one arm of the MZI. However, this built-in heater does not permit phase stability that is sufficient to measure high-fidelity teleportation, with the relative phase following the slowly varying ambient temperature of the room. To mitigate this instability, we build another casing, thermally isolating the MZI enclosure from the laboratory environment, and control the temperature via a closed-loop feedback control system based on a commercial thermoelectric cooler and a LTC1923 PID-controller. The temperature feedback is provided by a 10-kΩ NTC thermistor while the set point is applied with a programmable power supply. This control system permits us to measure visibilities by slowly varying $\varphi$ over time scales of up to 15 h. We remark that no TABLE II. Bob's photon-pair source is characterized by the measured mean photon number per time bin, $\mu_B$, and the rate of accidental and true-coincidence detections with a varied EDFA current.

| EDFA current (mA) | Coincidences (per 10 s) | Accidentals (per 10 s) | $\mu_B$ ($\times 10^{-3}$) |
|---|---|---|---|
| 400 | 469.2 ± 3.6 | 1.8 ± 0.3 | 3.9 ± 0.7 |
| 450 | 1156.3 ± 4.9 | 6.1 ± 0.5 | 5.3 ± 0.4 |
| 500 | 1653.9 ± 5.9 | 9.5 ± 0.6 | 5.8 ± 0.4 |
| 550 | 2095.8 ± 6.6 | 13.7 ± 0.8 | 6.5 ± 0.4 |
| 575 | 2343.2 ± 7.0 | 17.7 ± 0.9 | 7.5 ± 0.4 |
| 600 | 2548.7 ± 7.3 | 18.5 ± 0.9 | 8.0 ± 0.4 |

2. Characterization of the Example Quantum Teleportation System

We measured some key parameters of our system that underpin the teleportation fidelity. Specifically, we determine the fidelity of the entangled state produced by Bob by measuring the entanglement visibility $V_{ent}$[59] and also determine to what extent Alice and Bob's photons are indistinguishable at Charlie's BS using the HOM effect [51].

a. Entanglement Visibility

The state $|pair\rangle_B$ (and hence the entangled state $|\phi^+\rangle_B$), described in section 1b above is idealized. In reality, the state produced by Bob is better approximated by a two-mode squeezed vacuum state $|TMSV\rangle_B = \sqrt{1-p}\Sigma_{n=0}^{\infty}\sqrt{p}^n|nn\rangle_B$ after the FBG filter and neglecting loss [60]. Here, n is the number of photons per temporal mode (or qubit) and p is the emission probability of a single pair per mode (or qubit), with the state ordering referring to the signal and idler modes. However, $|TMSV\rangle_B$ approximates a photon pair for $p \lesssim 1$, with a $p \approx \mu_B$ mean number of pairs per mode (or qubit), conditioned on measurement of a pair such that the n=0 term is eliminated. As a compromise between the pair-creation rate $\propto p$ and the quality of entanglement, here and henceforth we set the mean photon number of our pair source to be $\mu_B = (8.0 \pm 0.4) \times 10^{-3}$ per time bin, which is feasible because of the exceptionally low dark counts of our SNSPDs. The measurement of $\mu_B$ is outlined in a following section.

We generate $|\phi_+\rangle_B$ and measure $V_{ent}$ by directing the idler photon to the second input port of the MZI, slightly modifying the setup of FIG. 1. The idler photon is delayed compared to the signal, allowing unambiguous measurement of each qubit. We vary $\varphi$ and project each qubit of the entangled state onto phase-varied superpositions of $|e\rangle$ and $|l\rangle$ by accumulating coincidence events of photons at both the outputs of the interferometer [59].

Figure 2:
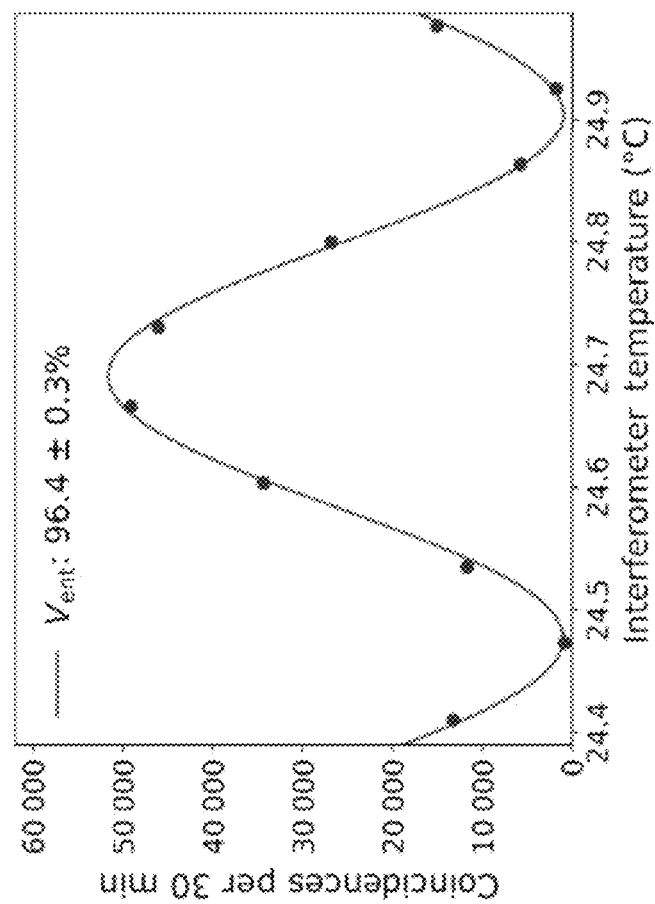
FIG. 2. Entanglement visibility. The temperature of the interferometer is varied to reveal the expected sinusoidal variations in the rate of coincidence events. A fit reveals the entanglement visibility $V_{ent}$=96.4±0.3% (see the main text for details). The uncertainties here and in all measurements are calculated assuming Poisson statistics.

The results shown in FIG. 2 are fitted proportional to $1 + V_{ent} \sin(\omega T + \Phi)$, where $V_{ent} = (R_x - R_n)/(R_x + R_n)$ with $R_{x(n)}$ denoting the maximum (minimum) rate of coincidence events [59], $\omega$ and $\Phi$ are unconstrained constants, and T is the temperature of the MZI, finding $V_{ent} = 96.4 \pm 0.3\%$.

The deviation from unit visibility is mainly due to non-zero multiphoton emissions [61], which is supported by an analytical model that includes experimental imperfections [62]. Nonetheless, this visibility is far beyond the ⅓ required for nonseparability of a Werner state [63] and the locality bound of $1/\sqrt{2}$ [59, 64]. Furthermore, it predicts a fidelity $F_{ent} = (3V_{ent} + 1)/4 = 97.3 \pm 2\%$ with respect to $|\phi^+\rangle$ [63] and hence is sufficient for quantum teleportation.

b. HOM Interference Visibility

The BSM relies on quantum interference of photons from Alice and Bob. This is ensured by the BS at Charlie, precise control of the arrival time of photons with IMs, identical FBG filters, and POCs (with PBSs) to provide the required indistinguishability. The degree of interference is quantified by way of the HOM interference visibility $V_{HOM} = (R_d - R_i)/R_d$, with $R_{d(i)}$ denoting the rate of coincident detections of photons after the BS when the photons are rendered as distinguishable (indistinguishable) as possible [51]. Completely indistinguishable single photons from Alice and Bob may yield $V_{HOM} = 1$. However, in our system, Alice's qubit is approximated from a coherent state $|\alpha\rangle_A = e^{-|\alpha|^2/2}\Sigma_{n=0}^{\infty}(\alpha^n/\sqrt{n!})|n\rangle_A$ with $\alpha \ll 1$, akin to how Bob's pair is approximated from $|TMSV\rangle_B$, with $\mu_A = |\alpha|^2$ being Alice's mean photon number per mode (or qubit) [60]. Therefore, the contribution of undesired photons from Alice and Bob lowers the maximum achievable $V_{HOM}$ below unity, with a further reduction if the interfering photons are not completely indistinguishable. The dependence of $V_{HOM}$ with varied $\mu_A$ and $\mu_B$, including effects of losses or distinguishable photons in our system, is analytically modeled in Ref [62] and further discussed below in Sec. 5.

Figure 3:
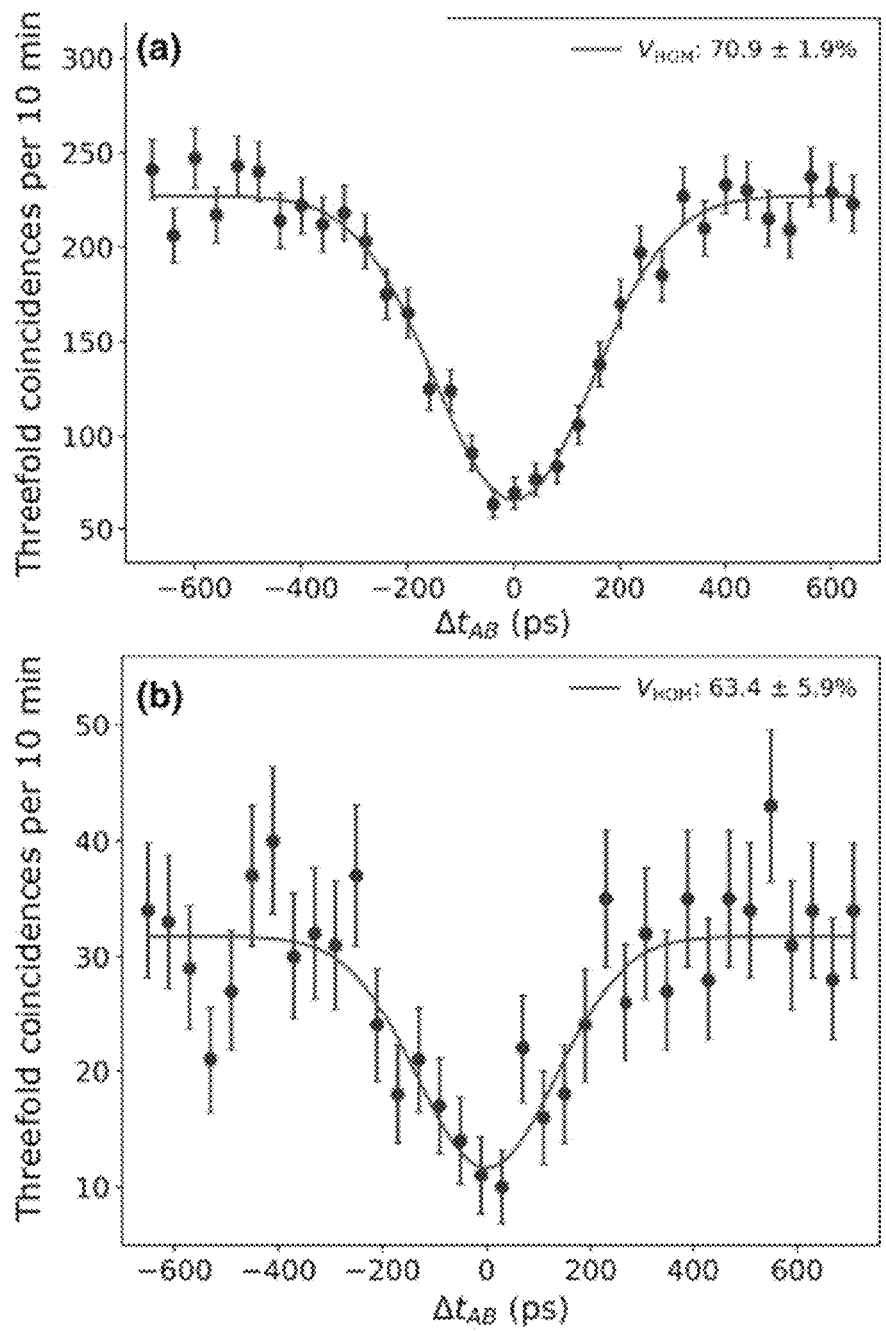
FIG. 3. Hong-Ou-Mandel (HOM) interference. A relative difference in arrival time is introduced between photons from Alice and Bob at Charlie's BS. HOM interference produces a reduction of the threefold coincidence detection rate of photons as measured with SNSPDs after Charlie's BS and at Bob. A fit reveals (a) $V_{HOM}$=70.9±1.9% and (b) $V_{HOM}$=63.4±5.9% when lengths of fiber are added (see the main text for details).

We measure $V_{HOM}$ by slightly modifying the setup of FIG. 1. We prepare $|A\rangle = |e\rangle_A$ with $\mu_A = 2.6 \times 10^{-3}$ and Bob as $|pair\rangle_B$ and direct Alice's photon and Bob's idler to Charlie, with Bob's signal bypassing the MZI to be directly measured by an SNSPD. Alice's IM is used to introduce distinguishability by way of a relative difference in arrival time $\Delta t_{AB}$ of Alice and Bob's photons at Charlie's BS. Using Charlie's SNSPDs and the third detector at Bob, a threefold coincidence detection rate is measured for varying $\Delta t_{AB}$, with results shown in FIG. 3(a). Since the temporal profiles of our photons are approximately Gaussian, we fit our results to $A[1 - V_{HOM} \exp(-\Delta t_{AB}^2/2\sigma^2)]$, where A is the maximum coincidence rate when the photons are completely distinguishable and $\sigma = 300$ ps is the 1/e temporal duration of the optical pulses [51, 65], finding $V_{HOM} = 70.9 \pm 1.9\%$. The maximum $V_{HOM}$ for this experiment is 83.5% if the photons are completely indistinguishable [62], with the difference ascribed to slight distinguishability between our photons as supported by the further measurements and analytical modeling in Sec. 5. Improvements to our system to remove this distinguishability are discussed in Sec. 8.

To test our system for quantum teleportation over long distances, we introduced 22-, 11-, and 11-km lengths of single-mode fiber between Alice and Charlie, Bob and Charlie, and in the path of Bob's signal photon, respectively, repeated our measurement of $V_{HOM}$, and fitted the results as before [see FIG. 3(b)]. We find $V_{HOM} = 63.4 \pm 5.9\%$, which is consistent with the maximum $V_{HOM}$ that we expect when including the impact of the additional 5.92−(2.56−) dB loss between Charlie and Alice (Bob) as well as the effect of photon distinguishability (analyzed in Sec. IV). This suggests that, importantly, the additional fiber does not introduce any further distinguishability (that we cannot account for), thereby supporting our system's use in quantum networking. Overall, the presence of clear HOM interference suggests that our system (with or without the additional fiber) introduces relatively little in the way of imperfections that can negatively impact the BSM and hence the fidelity of quantum teleportation.

13. Quantum Teleportation Using the Example Quantum Teleportation System

We performed quantum teleportation of the time-bin qubit basis states $|e\rangle$, $|l\rangle$ and $|+\rangle$, so as to measure the teleportation fidelities, $F_e$, $F_l$, and $F_+$, respectively, of the teleported states with respect to their ideal counterparts, up to the local unitary introduced by the BSM (see section 1c). Since measurement of $|+\rangle$ in our setup by symmetry is equivalent to any state of the form $(|e\rangle + e^{i\varphi}|l\rangle)/\sqrt{2}$ (and, in particular, the remaining three basis states $(|e\rangle - |l\rangle)/\sqrt{2}$ and $(|e\rangle \pm i|l\rangle)/\sqrt{2}$), we may determine the average teleportation fidelity $F_{avg} = (F_e + F_l + 4F_+)/6$ of any time-bin qubit.

Figure 4:
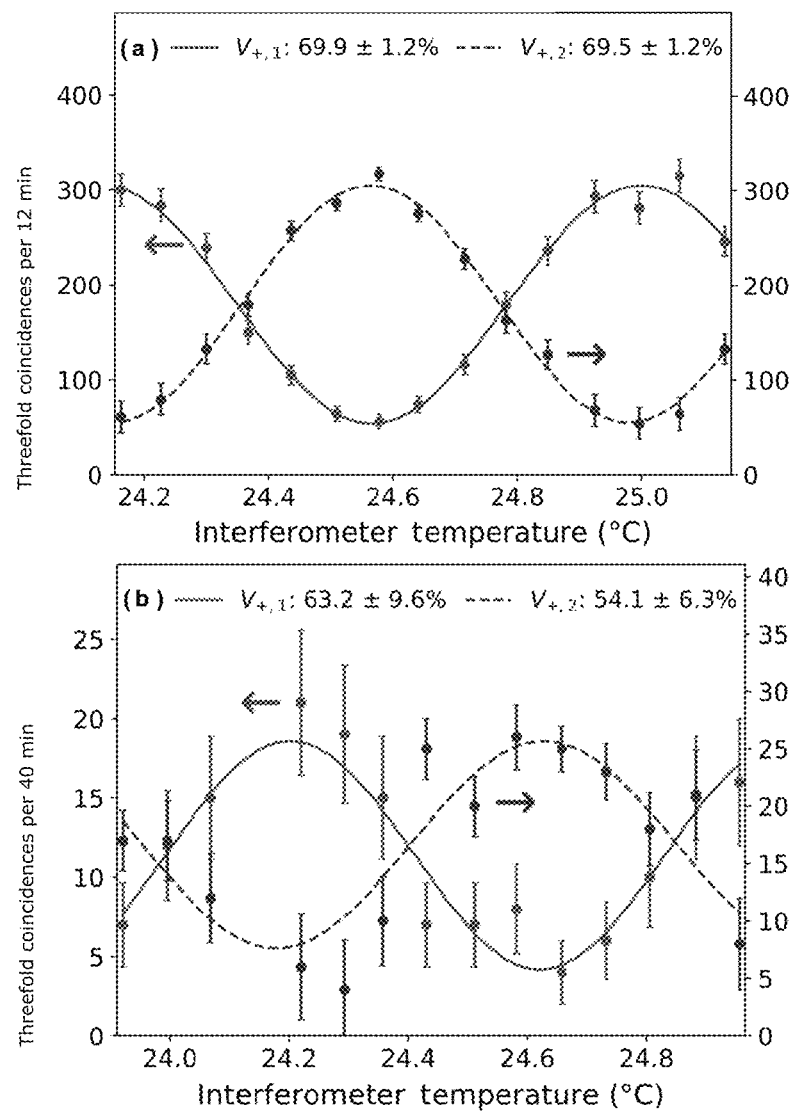
FIG. 4. The quantum teleportation of $|-\rangle$. Teleportation is performed (b) with and (a) without an additional 44 km of single-mode fiber inserted into the system. The temperature of the interferometer is varied to yield a sinusoidal variation of the threefold coincidence rate at each output of the MZI (blue and red points). A fit of the visibilities measured at each output ($V_{+,1}$, $V_{+,2}$) of the MZI gives an average visibility $V_+$=($V_{+,1}$+$V_{+,2}$)/2 of (a) 69.7±0.91% without the additional fiber and (b) 58.6±5.7% with the additional fiber.

First, we prepared $|e\rangle_A$ and $|l\rangle_A$ with $\mu_A = 3.53 \times 10^{-2}$, with Bob's idler bypassing the MZI to be detected by a single SNSPD. We measured $F_e = 95 \pm 1\%$ and $F_l = 96 \pm 1\%$, conditioned on a successful measurement of $|\Psi^-\rangle_{AB}$ at Charlie, with the fidelity limited by multiphoton events in Alice and Bob's qubits and dark counts of the SNSPDs [62]. We then repeat the measurement with $\mu_A = 9.5 \times 10^{-3}$ after inserting of a length (in this example, a 44-km length of fiber as described above to emulate Alice, Charlie, and parts of Bob being separated by long distances. This gives $F_e = 98 \pm 1\%$ and $F_l = 93 \pm 2\%$, with no reduction from the additional fiber loss owing to our low-noise single photon detectors (SNSPDs). Next, we prepare $|+\rangle_A$ with $\mu_A = 9.38 \times 10^{-3}$, insert the MZI and, conditioned on the BSM, we measure $F_+ = (1+V_+)/2 = 84.9 \pm 0.5\%$ by varying $\varphi$. Here, $V_+ = 69.7 \pm 0.9\%$ is the average visibility obtained by fits to the resultant interference measured at each output of the MZI, as shown in FIG. 4(a). The reduction in fidelity from unity is due to multiphoton events and distinguishability, consistent with that inferred from HOM interference, as supported by further measurements and analytical modeling in section 5.

The measurement is repeated with the additional long fiber, giving $V_+=58.6\pm5.7\%$ and $F_+=79.3\pm2.9\%$, with the results and the corresponding fit shown in FIG. 4(b) The reduced fidelity is likely due to aforementioned polarization variations over the long fibers, consistent with the reduction in HOM interference visibility, and is exacerbated here owing to the less than ideal visibility of the MZI over long measurement times.

The results yield $F_{avg}=89\pm1\%$ ($86\pm3\%$) without (with) the additional fiber, which is significantly above the classical bound of 2/3, implying strong evidence of quantum teleportation [66] and limited from unity by multiphoton events, distinguishability, and polarization variations, as mentioned [62].

Figure 8:
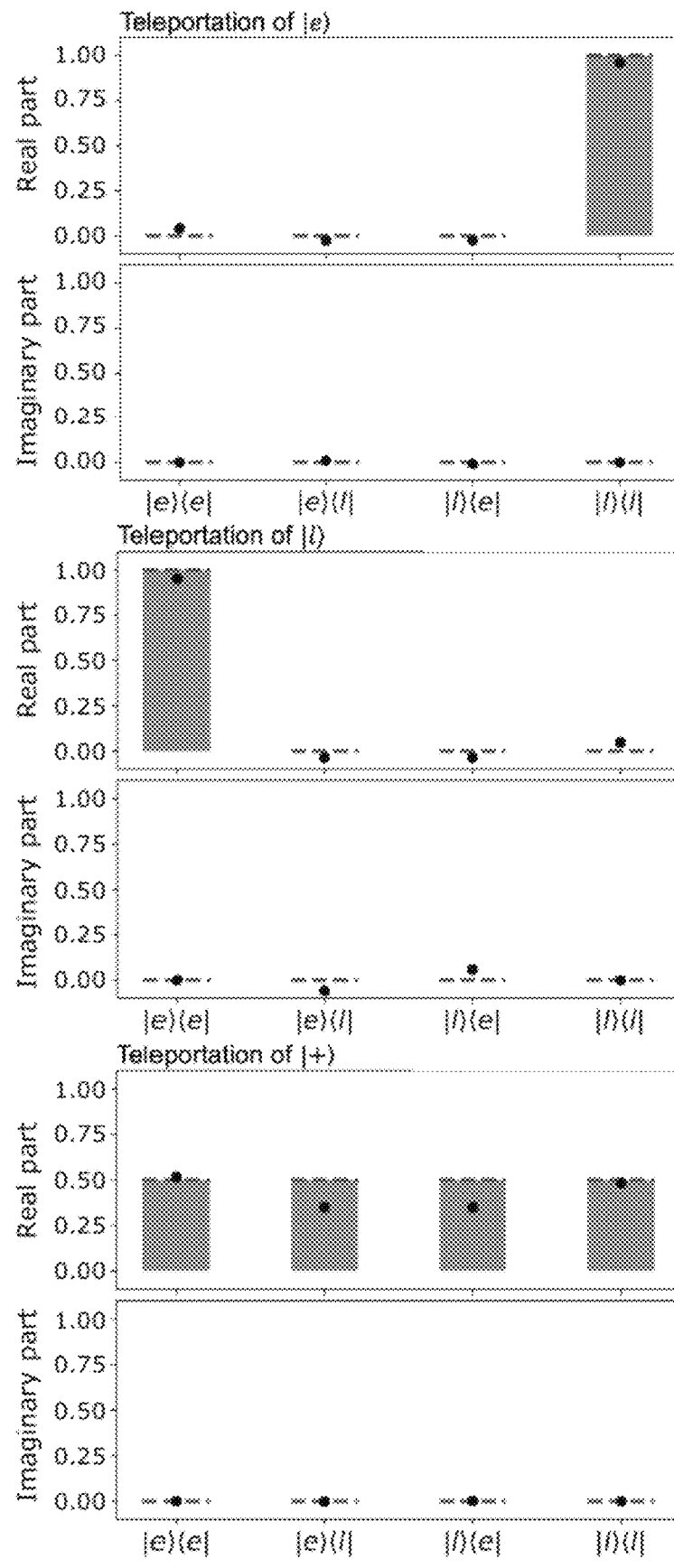
FIG. 8. The elements of the density matrices of teleported $|e\rangle$, $|1\rangle$, and $|+\rangle$ states with the additional 44 km of fiber in the system. The black points are generated by our teleportation system and the blue bars with red dashed lines are the values assuming ideal teleportation.
Figure 9:
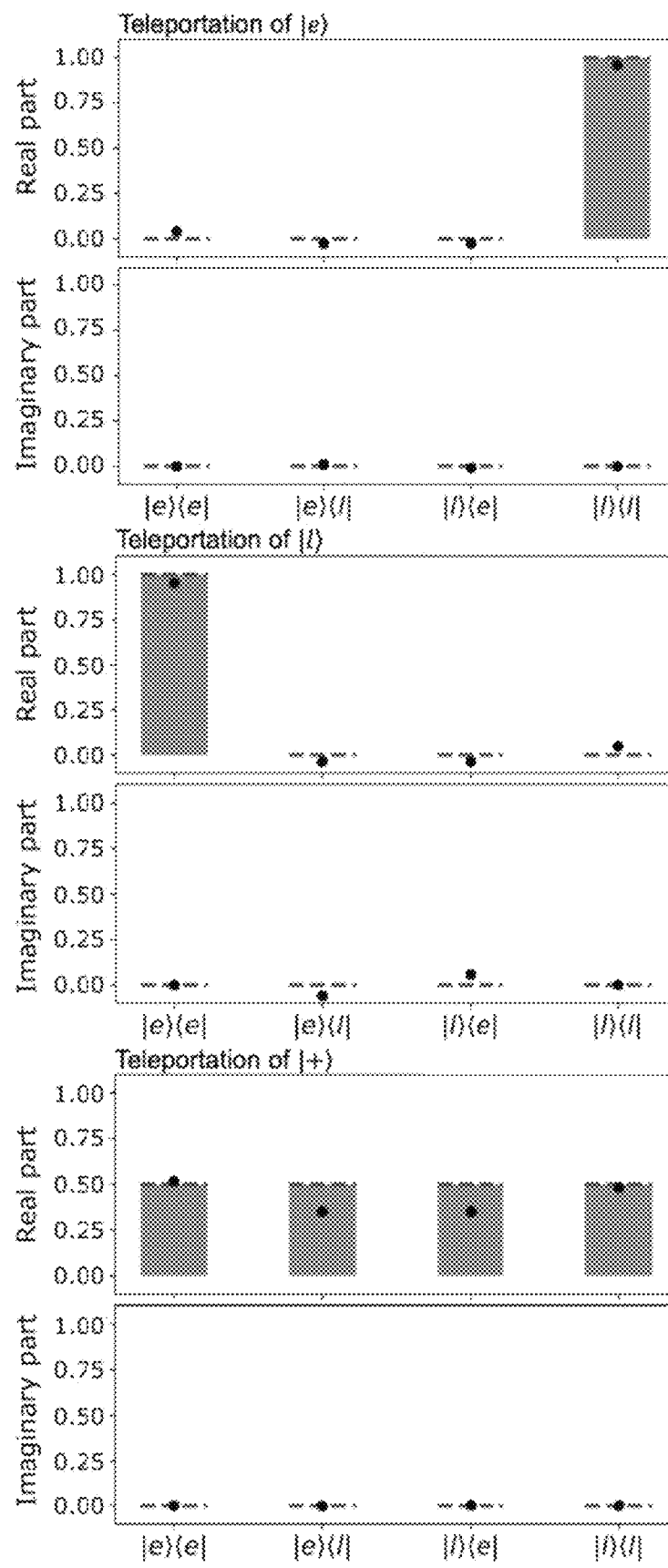
FIG. 9. The elements of the density matrices of teleported $|e\rangle$, $|\{\rangle$, and $|+\rangle$ states. The black points are generated by our teleportation system and the blue bars with red dashed lines are the values assuming ideal teleportation.

To glean more information about our teleportation system beyond the fidelity, we reconstruct the density matrices of the teleported states using a maximum-likelihood QST [52] described in Sec. 7. The results of the QST with and without the additional fiber lengths are summarized in FIGS. 8 and 9, respectively. As can be seen, the diagonal elements for |+⟩ are very close to the expected value, indicating the preservation of probabilities for the basis states of |e⟩ and |l⟩ after teleportation, while the deviation of the off-diagonal elements indicates the deterioration of coherence between the basis states. The decoherence is attributed to multiphoton emissions from our entangled pair source and distinguishability, consistent with the aforementioned teleportation fidelities of $|+\rangle_A$, and is further discussed in Sec. 5. Finally, we do also extract the teleportation fidelity from these density matrices, finding the results shown in FIG. 5 and $F_{avg}=89\pm1\%$($88\pm3\%$) without (with) the fiber spools, which are consistent with previous measurements given the similar $\mu_A$ used for QST.

The use of weak coherent states instead of ideal single photons reduces the teleportation fidelity because of multiphoton events. This effect is further discussed in Sec. 5. We also point out that the 2/3 classical bound may only be applied if Alice prepares her qubits using genuine single photons, i.e., $|n=1\rangle$, rather than using $|\alpha\ll 1\rangle$ as we do in this work [67]. As a way to account for the photon statistics of Alice's qubits, we turn to an analysis using decoy states.

3. Teleportation Fidelity Using Decoy States

To determine the minimum teleportation fidelity of qubits prepared using single photons, we use a DSM [53] and follow the approach of Refs. [33,68]. Decoy states, which are traditionally used in quantum key distribution to defend against photon-number splitting attacks, are qubits encoded into coherent states $|\alpha\rangle$ with varying mean photon number $\mu_A=|\alpha|^2$. By measuring fidelities of the teleported qubits for different $\mu_A$, the DSM allows us to calculate a lower bound $F_A^d$ on the teleportation fidelity if Alice had encoded her qubits using $|n=1\rangle$.

Figure 5:
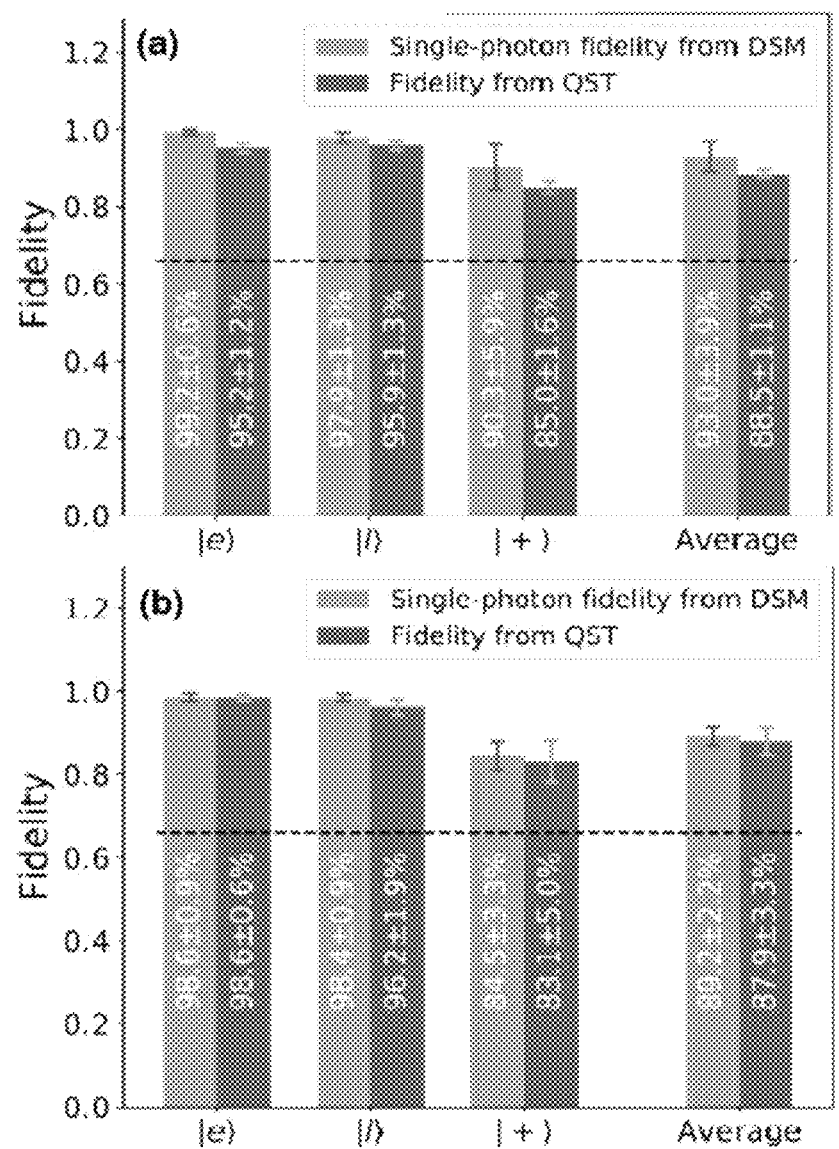
FIG. 5. Quantum teleportation fidelities for $|e\rangle_A$, $|1\rangle_A$ and $|+\rangle_A$, including the average fidelity. The dashed line represents the classical bound. Fidelities using QST are shown using blue bars, while the minimum fidelities for qubits prepared using $|n=1\rangle$, $F_s^d$, $F_l^d$, and $F_+^d$, including the associated average fidelity $F_{avg}^d$, respectively, using a DSM are shown in gray. (a),(b) The results without and with additional fiber, respectively. The uncertainties are calculated using Monte Carlo simulations with Poissonian statistics. without (with) the fiber spools, which are consistent with previous measurements given the similar $\mu_A$ used for QST.

We prepare decoy states $|e\rangle_A$, $|l\rangle_A$, and $|+\rangle_A$ with varying $\mu_A$, as listed in Table I, and perform quantum teleportation both with and without the added fiber, with teleportation fidelities shown in Table I. From these results, we calculate $F_A^d$ as shown in FIG. 5, with $F_{avg}^d \geq 93\pm4\%$ ($F_{avg}^d \geq 89\pm2\%$) without (with) the added fiber, which significantly violates the classical bound and the bound of 5/6 given by an optimal symmetric universal cloner [69,70], clearly demonstrating the capability of our system for high-fidelity teleportation. As depicted in FIG. 5, these fidelities nearly match the results we obtain without decoy states within statistical uncertainty. This is due to the suitable $\mu_A$, as well as low $\mu_B$ and SNSPD dark counts in our previous measurements [62].

TABLE I

The teleportation fidelities with (right column) and without (center column) the 44 - km length of fiber for Alice's qubit states prepared with varying $\mu_A$. The mean photon numbers and fidelities for vacuum states with fiber are assumed to be zero and 50%, respectively.

| qubit | without long fiber | | with long fiber | |
|---|---|---|---|---|
| | $\mu_A$ ($\times 10^{-3}$) | $F_A^d$ (%) | $\mu_A$ ($\times 10^{-3}$) | $F_A^d$ (%) |
| $|e\rangle_A$ | 3.53 | 95.2 ± 1 | 26.6 | 95.7 ± 1.5 |
| | 1.24 | 86.7 ± 2 | 9.01 | 98.4 ± 1.1 |
| | 0 | 52.8 ± 3.4 | — | — |
| $|l\rangle_A$ | 3.53 | 95.9 ± 1 | 32.9 | 98.6 ± 0.7 |
| | 1.24 | 90.5 ± 2 | 9.49 | 98.4 ± 1.6 |
| | 0 | 52.8 ± 3.4 | — | — |
| $|+\rangle_A$ | 9.38 | 84.7 ± 1.1 | 29.7 | 73.6 ± 3.0 |
| | 2.01 | 83.2 ± 3.6 | 10.6 | 82.21 ± 3.9 |
| | 0 | 52.8 ± 3.4 | — | — |

4. Example Analytical Model and Simulation

As our measurements have suggested, multiphoton components in, and distinguishability between, Alice and Bob's qubits reduce the values of key metrics including HOM interference visibility and, consequently, quantum teleportation fidelity. To capture these effects in our model, we employ a Gaussian-state characteristic-function method developed in Ref. [62], which is enabled by work in Ref. [71]. This approach is well suited to analyze our system because the quantum states, operations, and imperfections (including losses, dark counts, etc.) of the experiment can be fully described using Gaussian operators (see, e.g., Ref [72]). We now briefly outline the model of Ref. [62] and employ it to estimate the amount of indistinguishability $\zeta$ between Alice and Bob's qubits in our measurements of HOM interference and quantum teleportation.

Figure 6:
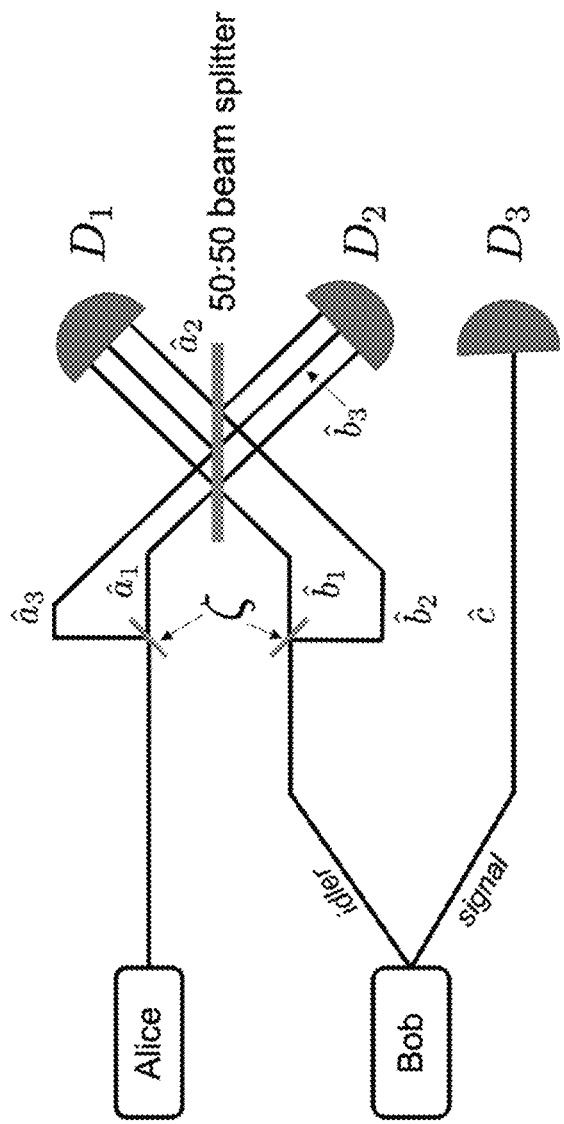
FIG. 6. A schematic depiction of the distinguishability between Alice and Bob's photons at Charlie's BS. The distinguishability is modeled by means of a virtual BS with a transmittance $\zeta$. Indistinguishable photons contribute to interference at the Charlie's BS while distinguishable photons are mixed with vacuum, leading to a reduction of HOM visibility and teleportation fidelity (see the main text for further details).

The distinguishability in any degree of freedom may be modeled by introducing a virtual BS of transmittance $\zeta$ into the paths of Alice and Bob's relevant photons. As shown in FIG. 6, the indistinguishable components of incoming photon modes are directed toward Charlie's BS, where they interfere, whereas distinguishable components are mixed with vacuum at the BS and do not contribute to interference. Here, $\zeta=1$ ($\zeta=0$) corresponds to the case when both incoming photons are perfectly indistinguishable (distinguishable). Now we may calculate the probability of a threefold coincidence detection event $P_{3f}$ between $D_1$, $D_2$ (Charlies' detectors) and $D_3$ (detects Bob's signal photon) for a given qubit state $\rho_{AB}$ from Alice and Bob:

$$P_{3f} = Tr\left\{\rho_{AB}\left(\mathbb{1} - (|0\rangle\langle 0|)^{\otimes 3}_{\hat{a}_1,\hat{a}_2,\hat{a}_3}\right) \otimes \left(\mathbb{1} - (|0\rangle\langle 0|)^{\otimes 3}_{\hat{b}_1,\hat{b}_2,\hat{b}_3}\right) \otimes (\mathbb{1} - (|0\rangle\langle 0|)_{\hat{c}})\right\}$$

where the $\hat{a}$ and $\hat{b}$ operators refer to modes, which originate from Alice and Bob's virtual BSs and are directed to $D_1$ and $D_2$, respectively, and $\hat{c}$ corresponds to Bob's idler mode, which is directed to $D_3$ (see FIG. 6). This allows the derivation of an expression for the HOM interference visibility $$V_{HOM}(\zeta) = [P_{3f}(0) - P_{3f}(\zeta)]/P_{3f}(0)$$

consistent with that introduced in Sec. 2b. Since Alice and Bob ideally produce $\rho_{AB}=|\alpha\rangle\langle\alpha|\otimes|\Psi_{TMSV}\rangle\langle\Psi_{TMSV}|$ and recognizing that all operators in $P_{3f}$ are Gaussian, we analytically derive $$P_{3f}(\zeta) = 1 - 2\frac{\exp\left(-\frac{(\mu_A/2)[1+(1-\zeta^2)\eta_i\mu_B/2]}{1+\eta_i\mu_B/2}\right)}{1+\eta_i\mu_B/2} - \frac{1}{1+\eta_s\mu_B} + \frac{\exp(-\mu_A)}{1+\eta_i\mu_B} - \frac{\exp(-\mu_A)}{1+(1-\eta_s)\eta_i\mu_B+\eta_s\mu_B} + 2\frac{\exp\left(-\frac{(\mu_A/2)[1+(1-\zeta^2)(1-\eta_s)\eta_i\mu_B/2+\eta_s\mu_B]}{1+(1-\eta_s)\eta_i\mu_B/2+\eta_s\mu_B}\right)}{1+(1-\eta_s)\eta_i\mu_B/2+\eta_s\mu_B}$$

for varied $\zeta$, where $\eta_i$ and $\eta_s$ are the transmission efficiencies of the signal and idler photons, including the detector efficiencies. We similarly calculate the impact of distinguishability on the teleportation fidelity of $|+\rangle$:

$$F(\zeta) = P_{3f}(\zeta, \varphi_{max})/[P_{3f}(\zeta, \varphi_{max}) + P_{3f}(\zeta, \varphi_{min})]$$

where $\varphi_{max}(\varphi_{min})$ is the phase of the MZI added into the path of the signal photon, corresponding to maximum (minimum) threefold detection rates.

Figure 7:
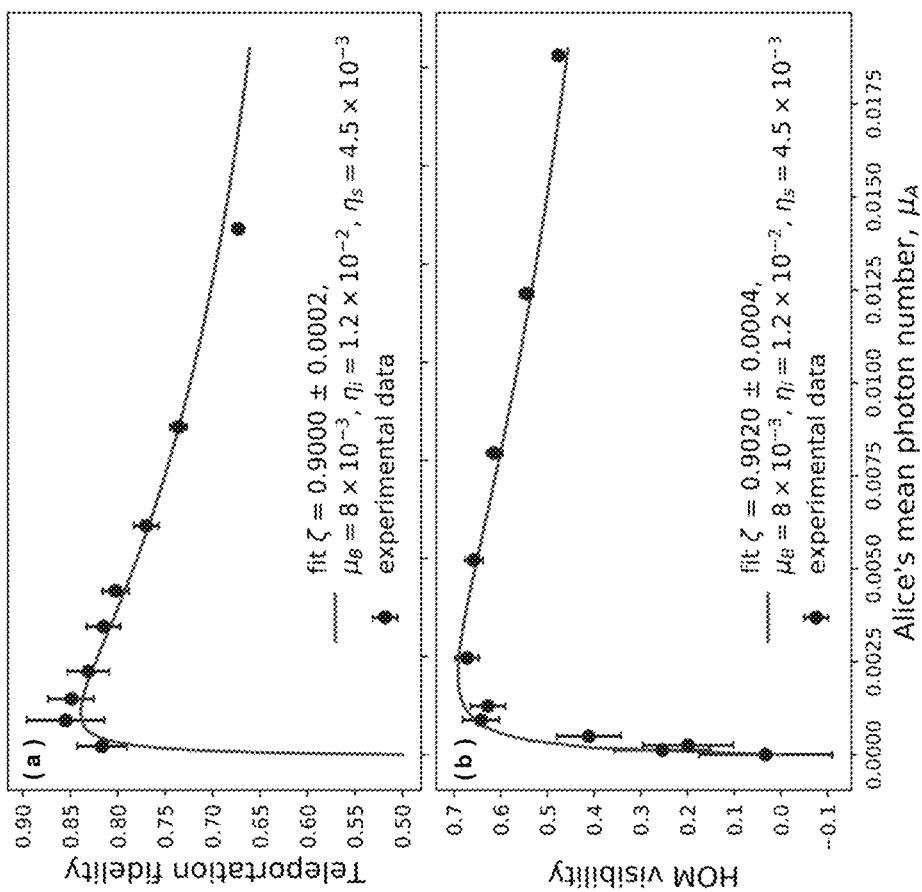
FIG. 7. The evaluation of the photon indistinguishability using an analytical model. (a) The quantum teleportation fidelity of $|+\rangle$. (b) The HOM interference visibility, each with varied mean photon number $\mu_A$ of Alice's qubits. Fits of analytical models to the data reveal $\zeta$=90% indistinguishability between Alice and Bob's photons at Charlie's BS. Bob produces $\mu_B$ photon pairs on average, while $\eta_i$ and $\eta_s$ are the probabilities for an individual idler (signal) photon to arrive at Charlie's BS and be detected at Bob's detector, respectively.

To compare the model to our measurements, we use the experimental mean photon numbers for the photon-pair source $\eta_i=1.2\times10^{-2}$ and $\eta_s=4.5\times10^{-3}$, as determined by the method described in Appendix B. We then measure the teleportation fidelity of $|+\rangle$ and HOM interference visibility (keeping the MZI in the system to ensure that $\eta_s$ remains unchanged) for different values $\mu_A$. The results are plotted in FIG. 7. The data are then fitted to the expressions $V_{HOM}(\zeta)$ and $F(\zeta)$ derived in our model and graphed in FIG. 7. The maximum teleportation fidelity and HOM visibility are approximately 0.85 and approximately 0.65, respectively, and are maximized around $\mu_A=0.001$. The teleportation fidelity and HOM visibility decrease to 0.5 and 0.0, respectively, when $\mu_A=0$ corresponding to a vacuum input from Alice. The decrease at large values of $\mu_A$ is predominantly due to the multiphoton events from Alice.

The fitted curves are in very good agreement with our experimental values and consistently yield a value of $\zeta=90\%$ for both measurement types. This implies that we have only a small amount of residual distinguishability between Alice and Bob's photons. The potential effects leading to this distinguishability are discussed in Sec. 8.

Overall, our analytical model is consistent with our experimental data [62] and our experimental setup allows high-fidelity teleportation of arbitrary time-bin qubits in the regime of $\mu_A\ll1$, which is the parameter space most often used in quantum networking protocols (e.g., key distribution). Our model thus offers a practical way to determine any underlying distinguishability in a deployed network where a full characterization of the properties of Alice and Bob's photons may not be possible.

5. Example Estimation of Mean Number of Photon Pairs and Transmission Efficiencies of Signal and Idler Photons Using a method described in Ref. [59], we measure the mean number of photon pairs produced by Bob, $\mu_B$, as a function of the laser-excitation power before the PPLN waveguide used for SHG. To this end, we modify the setup of FIG. 1 and direct each of Bob's signal and idler photons to a SNSPD. We then measure detection events while varying the amplification of our EDFA by way of an applied current. We extract events when photon pairs that originate from the same clock cycle are measured in coincidence and when one photon originating from a cycle is measured in coincidence with a photon originating from a preceding or following clock cycle; in other words, we measure the so-called coincidence and accidental rates. The ratio of accidentals to coincidences approximates $\mu_B\ll1$, with all results shown in Table II. For all measurements, we use $\mu_B=(8.0\pm0.4)\times10^{-3}$ per time bin, which corresponds to an EDFA current of 600 mA.

The transmission efficiencies of the signal and idler photons, $\eta_s$ and $\eta_i$, respectively, mentioned in Sec. 5, are determined by calculating the ratio of the independent rates of detection of the idler and signal photons, respectively, with the coincidence rate of the photons pairs (in the same clock cycle) [59]. We repeat the measurements using the setup shown in FIG. 1, which is that used to generate the results of FIG. 7 (i.e., we direct the signal and idler photons through the setup as if we are to perform teleportation). We find $\eta_s=4.5\times10^{-3}$ and $\eta_i=1.2\times10^{-2}$, which take into account losses between when the photons are produced and when they are detected by their respective low dark count single photon detectors (SNSPDs).

6. Quantum State Tomography

We perform projection measurements on the teleported states $|e\rangle_A$, $|1\rangle_B$, and $|+\rangle_A$ in all three of the qubit bases formed by the Pauli matrices $\sigma_x$, $\sigma_y$, and $\sigma_z$, i.e., measuring photons at each of the arrival times after the MZI and at varying $\varphi$. These results allow reconstruction of the density matrix of each teleported state, both with and without the additional (e.g., 44 km) of fiber, using maximum-likelihood estimation [52]. Our resultant matrices clearly match the expected teleported state, with the calculated high teleportation fidelities in Sec. 3, up to the aforementioned effects due to multiple photons and distinguishability.

7. Advantages and Improvements

Illustrative results and system presented herein demonstrate quantum teleportation systems for photonic time-bin qubits at a quantum channel- and device compatible wavelength of 1536.5 nm using a fiber-based setup comprising state-of-the-art SNSPDs and off-the-shelf components. We measure an average fidelity above 90% using QST and a decoy-state analysis with up to 44 km of single-mode fiber in our setup. Our results are further supported by an analytical model in conjunction with measurements of the entanglement and HOM interference visibilities.

The decoy-state analysis indicates that the maximum teleportation fidelity is currently restricted by that of the teleported qubits prepared in superposition states, for which a 10% distinguishability between the qubits undergoing BSM and the contribution of multiple photon pairs play the largest role. Our model predicts that the average fidelity will increase to 95% with completely indistinguishable photons, while fidelities close to unity can be achieved with a lowered mean number of photon pairs. Alternatively, we may replace our SNSPDs with efficient photon-number-resolving (PNR) SNSPDs [73] to allow post selection of multiphoton events at the MZI or BSM [74]. Both approaches must be accompanied by increased coupling efficiencies of the pair source beyond the current approximately 1%, either to maintain realistic teleportation rates (above the system noise and current rate of phase drift of the MZI) or to derive any advantage from PNR capability.

As suggested by the width of our HOM interference fringe—which predicts an average photon bandwidth of 0.44/σ~1.5 GHz (see Sec. 2b), i.e., less than the 2 GHz bandwidth of our FBGs—the indistinguishability in our system could be limited by the large difference in the bandwidth between the photons originating from the SPDC (>100 GHz) and those generated at Alice by the IM (15 GHz), leading to nonidentical filtering by the FBG. This can be improved by narrower FBGs or by using a more broadband pump at Alice [e.g., using a mode-locked laser or a higher-bandwidth IM (say, >500 GHz), which is commercially available]. Alternatively, pure photon pairs may be generated by engineered phase matching (see, e.g., Ref. [75]).

Distinguishability owing to nonlinear modulation during the SHG process could also play a role [76]. The origin of distinguishability in our system, whether due to imperfect filtering or other device imperfections (e.g., PBS or BS) can be studied. The coupling loss can be minimized to less than a few decibels overall by improved fiber-to-chip coupling, lower-loss components of the FBGs (e.g., the required isolator), spliced fiber connections, and reduced losses within our MZI. Note that our current coupling efficiency is equivalent to approximately 50 km of single-mode fiber, suggesting that our system is well suited for quantum networks provided that the loss is reduced.

The fidelities that we demonstrate are sufficient for several applications, and the current teleportation rates with the 44 km length of fiber, which are approximately in the Hertz range, can be increased. Higher repetition rates (e.g., through the use of high-bandwidth modulators with wideband wavelength-division-multiplexed filters and low-jitter SNSPDs [77]), improvements to coupling and detector efficiencies, enhanced BSM efficiency with fast-recovery SNSPDs [78], or multiplexing in frequency [68] will all yield substantial increases in the teleportation rate to gigahertz levels. Note that increased repetition rates permit a reduction in the time-bin separation, which will allow us to construct the MZI on chip, providing exceptional phase stability and, hence, achievable fidelity. Importantly, the aforementioned increases in the repetition rate and efficiency can be further afforded by improvements in low dark count single photon detector (e.g., SNSPD) technology.

Further system-level modifications include further automation by the implementation of free-running temporal and polarization feedback schemes to render the photons indistinguishable at the BSM [33, 34]. Furthermore, several electrical components can be miniaturized, scaled, and made more cost effective (e.g., field-programmable gate arrays can replace the AWG). We note that our system can be extended to independent lasers at different locations, also with appropriate feedback mechanisms for spectral overlap [79, 80]. These modifications are compatible with the data acquisition and control systems.

Overall, our high-fidelity teleportation systems—achieving state-of-the-art teleportation fidelities of time bin qubits—serve as a blue-print for the construction of quantum network test beds and eventually global quantum networks toward the quantum Internet. The present disclosure has described a complete analytical model of the teleportation system that includes imperfections and has compared it with our measurements. Our implementation, using approaches from HEP experimental systems and real-world quantum networking, features near fully automated data acquisition, monitoring, and real-time data analysis. The high fidelities achieved in our experiments using practical and replicable devices are essential when expanding a quantum network to many nodes and enable the realization of more advanced protocols (see, e.g., Refs. [18, 81, 82]).

Device Embodiments

A device, system, quantum teleportation system and method of operating the teleportation system can be embodied in many ways including, but not limited to, the following (referring also to reference numbers in FIGS. 1-11).

1. A quantum teleportation system (100), comprising:
    a transmitter (102) generating first photons (104);
    a source (106) of pairs (108) of entangled photons, each pair (108) comprising a second photon (110) entangled with a third photon (112);
    a coupler (114) electromagnetically coupled to the transmitter (102) and the source (106) of pairs (108) of entangled photons;
    a pair of detectors D1 and D2 electromagnetically coupled to the coupler (114); a receiver (116) including a detection system (118) comprising a detector D3 detecting the third photon (112);
    an optical fiber (120) connecting the detector D3 and the source (106) of pairs (108) of entangled photons, wherein the detector D3 detects the third photons (112) transmitted along the optical fiber (120);
    a clock distribution system (122) outputting one or more clock signals (124) controlling timing of the first photons (104), the second photons (110), and the third photons (112) such that:
        the coupler (114) interacts one of the first photons (104), carrying a first qubit (60), and one of the second photons (110), carrying a second qubit, to form an interference;
        the pair of detectors D1 and D2 detect the interference used to obtain a Bell State Measurement of a quantum system comprising the first qubit and the second qubit;
        the detector D3 detects the one of the third photons (112) entangled with the one of the second photons (110) and outputs a signal in response thereto; and
        the detection system (118) reads a state of the first qubit using the signal and the Bell State Measurement;
    a data acquisition system (126) acquiring arrival times of the first photons (104) and the second photons (110) at the detectors D1 and D2, and the arrival times of the third photons (112) at the detector D3, wherein the arrival times are tagged with reference to the clock signals (124) so that one or more sets of photons may be identified, each set comprising the one of the first photons (104), the one of the second photons (110), and the one of the third photons (112); and
    a computer (128, 1000, 1002) (e.g., a classical computer, e.g., non-quantum computer) benchmarking the quantum teleportation system (100) in real time using the arrival times.

2. The system (100) of example 1, wherein:
    the transmitter (102) generates pulses of electromagnetic radiation (103) each comprising one or more of the first photons (104),
    the system (100) further comprises:
    a first attenuator (134) attenuating the pulses of electromagnetic radiation so as to output attenuated pulses each comprising a first mean number of the first photons (104), the first mean number of photons received on the coupler (114) increasing a likelihood the coupler (114) interacts a single one of the first photons (104) with a single one of the second photons (110) to form the interference;

a first filter (132) electromagnetically coupled to the coupler (114) and spectrally filtering the electromagnetic radiation so as to increase indistinguishability between the one of the first photons (104) and the one of the second photons (110);

one or more second filters electromagnetically coupled to the source (106) of pairs (108) of entangled photons and spectrally filtering the entangled photons;

the first qubit and the second qubit each comprise a time bin qubit comprising a superposition of an early photon (140) with a later arriving photon (142); and the source (106) of entangled photons comprises a laser (LAS) pumping a nonlinear material (107) so as to output the second photons (110) comprising idler photons and the third photons (112) comprising signal photons according to a spontaneous parametric down conversion (SPDC) process.

3. The system of example 1 or 2, wherein the benchmarking comprises determining at least one of a teleportation fidelity of the first qubit teleported to the one of the third photons (112) received at D3, a degree of indistinguishability between the one of the first photons (104) and the one of the second photons (110), or a threefold coincidence photon detection rate of one of the photons (104), (110), (112) being coincidentally detected at each of D1, D2, and D2.

4. The system of any of the examples 1-3, wherein the benchmarking comprises using a model or algorithm simulating at least one of teleportation fidelity of the first qubit teleported to the one of the third photons (112) received at the detector D3, or a degree of indistinguishability between the one of the first photons (104) and the one of the second photons (110), as a function of a mean number of the second photons (110), wherein the model is calibrated and validated using experimental measurements of the teleportation fidelity and the degree of indistinguishability.

5. The system of any of the examples 1-4, wherein:
the first qubit (60) and the second qubit (60) each comprise a time bin qubit comprising a superposition of an early photon (140) with a later arriving photon (142);
the source (106) of entangled photons comprises a laser (LAS) pumping a nonlinear material (107) so as to output the one of the second photons (110) comprising an idler photon and the one of the third photons (112) comprising a signal photon according to a spontaneous parametric down conversion (SPDC) process;
the clock signal (124) comprises clock cycles (125);
the data acquisition system (126) measures a mean number of the second photons (110) by comparing:
a coincidence rate, comprising events wherein the one of the second photons (110) and the one of the third photons (112) in the pair are detected in a same one of the clock cycles; and
an accidental rate, comprising events wherein the one of the second photons (110) and the one of the third photons (112) in the entangled pair (108) are detected in different ones of the clock cycles (125).

6. The system of any of the examples 4-5 wherein the degree of indistinguishability is measured by performing a Hong-Ou-Mandel experiment observing the interference using the coupler (114) comprising a beamsplitter (BS); and the teleportation fidelity is measured using an interferometer (MZI) measuring visibility of interference of the third photon (112) with itself.

7. The system of any of the examples 4-6, wherein the model computes the teleportation fidelity and the amount of indistinguishability by:
determining a probability $P_{3f}$ of a threefold coincidence detection of one of the photons on each of the detectors D1, D2 and D3

$$P_{3f} = Tr\{\rho_{AB}(1-(|0\rangle\langle 0|)^{\otimes 3}_{\hat{a}_1,\hat{a}_2,\hat{a}_3}) \otimes (1-(|0\rangle\langle 0|)^{\otimes 3}_{\hat{b}_1,\hat{b}_2,\hat{b}_3}) \otimes (1-(|0\rangle\langle 0|)_{\hat{c}})\}$$

where:
$\hat{a}$ and $\hat{b}$ operators represent modes of the one of the first photons (104) and the one of the second photon (110)s, respectively, that are indistinguishable (62),
$\hat{c}$ represents a mode of the one of the third photon (112)s directed on the detector $D_3$, and $$\rho_{AB} = (|\alpha\rangle\langle\alpha|) \otimes (|\Psi_{TMSV}\rangle\langle\Psi_{TMSV}|)$$

represents a quantum state of the quantum system;

determining the amount of indistinguishability
$V_{HOM}(\zeta)=[P_{3f}(0)-P_{3f}(\zeta)]/P_{3f}(0)$
where $\zeta$ is an amount of indistinguishability between the first qubit and the
second qubit, such that $\zeta=1$ ($\zeta=0$) corresponds to the case when both the first qubit and the second qubit are perfectly indistinguishable (distinguishable); and
determining the teleportation fidelity
$F(\zeta)=P_{3f}(\zeta,\varphi_{max})/[P_{3f}(\zeta,\varphi_{max})+P_{3f}(\zeta,\varphi_{min})]$, where $\varphi_{max}$ ($\varphi_{min}$) is a maximum (minimum) phase added into a path of the one of the second photons (110), corresponding to a maximum (minimum) rate of the threefold coincidence detection.

8. The system of example 7, wherein:

$$P_{3f}(\zeta) = 1 - 2\frac{\exp\left(-\frac{(\mu_A/2)[1+(1-\zeta^2)\eta_i\mu_B/2]}{1+\eta_i\mu_B/2}\right)}{1+\eta_i\mu_B/2} -$$

$$\frac{1}{1+\eta_s\mu_B} + \frac{\exp(-\mu_A)}{1+\eta_i\mu_B} - \frac{\exp(-\mu_A)}{1+(1-\eta_s)\eta_i\mu_B+\eta_s\mu_B} +$$

$$2\frac{\exp\left(-\frac{(\mu_A/2)[1+(1-\zeta^2)(1-\eta_s)\eta_i\mu_B/2+\eta_s\mu_B]}{1+(1-\eta_s)\eta_i\mu_B/2+\eta_s\mu_B}\right)}{1+(1-\eta_s)\eta_i\mu_B/2+\eta_s\mu_B}$$

where $\eta_i$ and $\eta_s$ are the transmission efficiencies of the second photons (110) and the third photons (112), respectively, including the detector efficiencies, $\mu_A$ is the mean number of the first photons (104) per time bin, and $\mu_B$ is the mean number of second photons (110) per time bin.

9. The system of any of the examples 1-8, wherein:
the first qubit comprises a first time bin qubit and the second qubit comprises a second time bin qubit,
the clock signal (124) comprises clock cycles (125);
the data acquisition system (126) acquires:
a coincidence rate, comprising events wherein the one of the second photons (110) and the one of the third photons (112) in the pair (108) of entangled photons are detected in a same one of the clock cycles (125);

an accidental rate, comprising events wherein the one of the second photons (110) and the one of the third photons (112) in the entangled pair are detected in different clock cycles;

a first detection rate of the second photons (110); and a second detection rate of the third photons (112);

$\eta_i$ is the second detection rate divided by the coincidence rate and $\eta_s$ is the first detection rate divided by the coincidence rate; and the mean number of the second photons (110) per time bin is the accidental rate divided by the coincidence rate.

10. The system of any of the examples 4-9, wherein the model calculates a probability of the detectors D1, D2, and D3 receiving the first photon (142), the second photon (110) and the third photon (112) in a same clock cycle (125), using a fitting parameter comprising a transmittance representing the amount of indistinguishability.

11. The system of any of the examples 1-10, wherein the computer (128) uses the benchmarking to output feedback used to optimize at least one of the timing, an intensity of the entangled photons (108) outputted from the source (106) of entangled photons, the spectral filtering of the photons, or an amount of attenuation of the pulses of electromagnetic radiation, so as to achieve the teleportation fidelity greater than 0.90 or 0.99 (99%) when the third photons (112) travel a distance of at least 22 kilometers along the optical fiber (120).

12. The system of any of the examples 1-10, further comprising a display (130) displaying the benchmarking (e.g. graphically displaying the benchmarking so that the benchmarking, such as teleportation fidelity, indistinguishability can be visualized, e.g., on a plot).

13. A method of teleporting using a quantum teleportation system, comprising:

teleporting a first qubit, comprising:

performing a Bell State Measurement of a quantum system, comprising interfering one or more first photons, carrying the first qubit, and one or more second photons, carrying a second qubit, wherein the quantum system comprises one of the first photons and one of the second photons;

detecting one or more third photons, each of the third photons entangled with one of the second photons prior to the interfering;

reading a state of the first qubit using the Bell State Measurement;

acquiring arrival times of the first photons and the second photons at detectors D1, D2 used to perform the Bell State Measurement, and the arrival times of the third photons at the receiver, wherein the arrival times are tagged with reference to clock signals so that one or more sets of photons may be identified, each set comprising the one of the first photons, the one of the second photons, and the one of the third photons; and benchmarking the quantum teleportation system in real time using the arrival times.

14. The method of example 13, using quantum teleportation system of any of the examples 1-12.

15. A physical layer 1080 useful for implementing an internet network, the physical layer comprising hardware comprising one or more circuits (e.g., integrated circuits, e.g., PHY chip) and/or photonic integrated circuits and/or optical devices comprising, coupled to, or connected to the teleportation system of any of the examples 1-14.

16. The physical layer of example 15, wherein the physical layer defines the means of transmitting a stream of raw bits over a physical data link connecting network nodes and specifies at least one of the shapes and properties of the electrical and optical connectors (e.g., optical fibers), the frequencies to broadcast on, the line code to use and similar low-level parameters or other underlying the higher level functions in a network. In one or more examples, the physical layer performs symbol encoding, transmission, reception and decoding (e.g., bit-by-bit or symbol-by-symbol data delivery over a physical transmission medium] and provides an interface to the transmission medium, including a mechanical specification of the connectors and cables.

17. The system (100) and/or physical layer of any of the examples 1-16 operated under or by a control plane layer, wherein the control plane layer is directed/orchestrated by an applications layer on top, wherein based on the need(s) of a client interacting with the application layer, the necessary requirements of the application are input to the control plane layer so that the control plane layer appropriately reconfigures the teleportation system or one or more of the devices (e.g., transmitter, receiver, clock distribution system, data acquisition system) in the teleportation system 100.

18. The system (100) of any of the examples 1-16, wherein the applications layer and/or or control plane layer receive the benchmarking and/or the control plane layer is directed by the applications layer using or taking into account the benchmarking and/or the control plane layer reconfigures the teleportation system using the benchmarking.

19. A quantum internet or quantum network comprising the system of any of the examples 1-18.

20. A network comprising the network or internet of example 19, wherein the network is scaled or interconnected to other computers using the benchmarking and one or more quantum transducers.

21. The system or network of any of the examples 1-10, wherein the benchmarking comprises network benchmarking using the arrival times and the model to output a measurement or determination or test of one or more figures of merits or performance metrics of the network or system for communicating or transmitting data, wherein the figures of merit comprise at least one of speed of transmission, data transfer rate (upload or download speed), latency, throughput, or reliability, packet loss, of data transmitted by the system or through the network using the first qubit and the entangled photons.

22. The system of any of the examples 1-21, wherein the benchmarking compares the figures of merit or metrics with the figures of merit or performance metrics provided by a user or client or another network, a standard, a norm, as a function of client usage at different times of the day.

23. The system of any of the examples, wherein the benchmarking outputs/determines the figures of merit or performance metrics using the arrival times and confirms the arrival times are associated with a successful data transmission using the model.

24. The system of any of the examples comprising a loop quantum system.

25. The system of any of the examples, wherein the system performs quantum entanglement distribution.

26. The system of any of the examples 1-25, wherein the benchmarking performs real time analysis of data including rate and fidelity of transmission of data transmitted via teleportation using classical time tagging of quantum channels and benchmarking and verification of quantum channels.

27. The system of any of the examples 1-26, wherein the clock distribution system 122 and/or quantum teleportation system 100 is coupled to or comprises the synchronization system described in [84], e.g., so that the clocks in the different nodes are synchronized, the signal photons are tagged using the clock photons.

Hardware Environment

Figure 10:
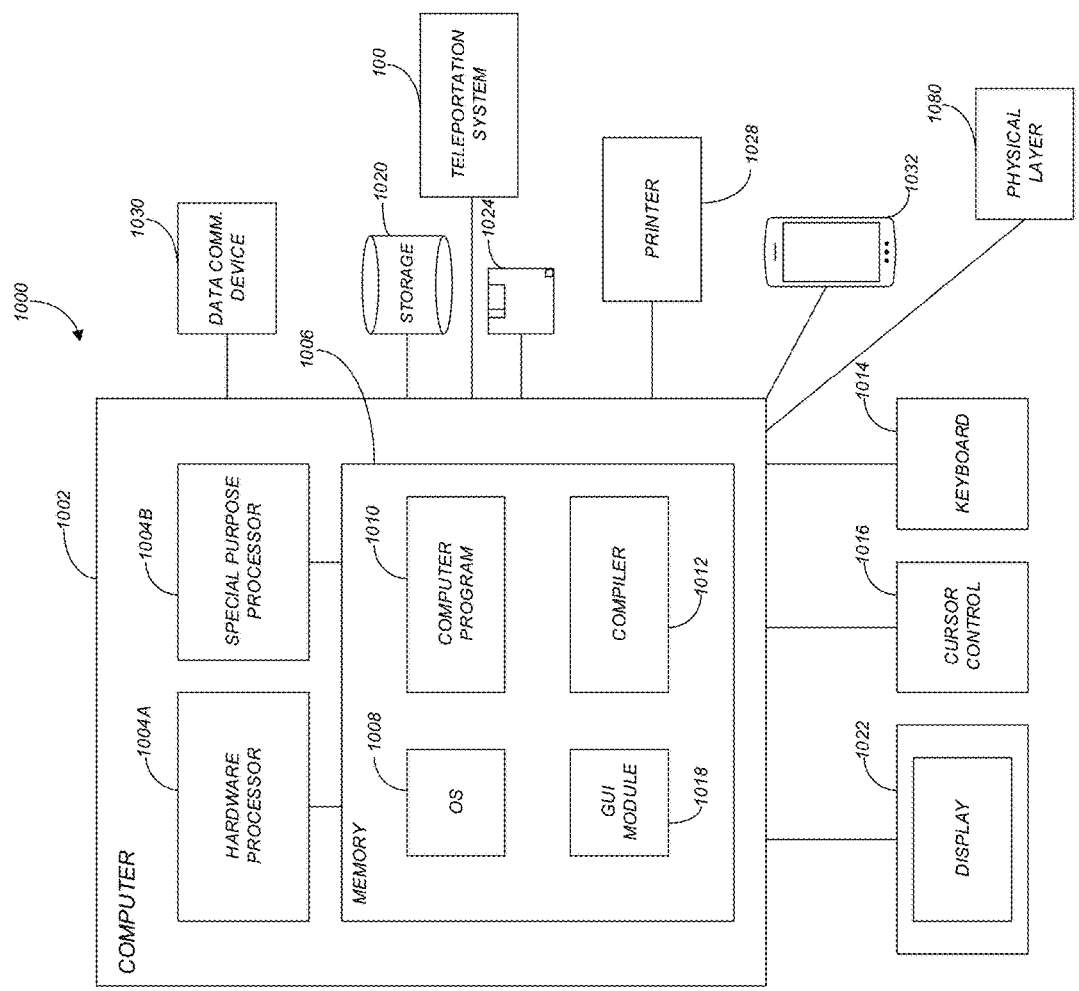
FIG. 10 is an exemplary hardware and software environment.

FIG. 10 is an exemplary hardware and software environment 1000 (referred to as a computer-implemented system and/or computer-implemented method) used to implement one or more embodiments of the invention and which may be connected to the teleportation system 100, e.g., as may be used for performing the benchmarking. In one or more examples, computer system may comprise or be coupled to a physical layer 1080. The hardware and software environment includes a computer 1002 and may include peripherals. Computer 1002 may be a user/client computer, server computer, or may be a database computer. The computer 1002 comprises a hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., IPAD, portable digital video player, cellular device, personal digital assistant, etc.). In yet another embodiment, the computer 1002 may comprise a multi-touch device, mobile phone, gaming system, or internet enabled device executing on various platforms and operating systems.

In one embodiment, the computer 1002 operates by the hardware processor 1004A performing instructions defined by the computer program 1010 (e.g., a control or benchmarking application) under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC) or Field Programmable Gate Array (FPGA).

The computer 1002 may also implement a compiler 1012 that allows an application or computer program 1010 written in a programming language such as C, C++, Assembly, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 11:
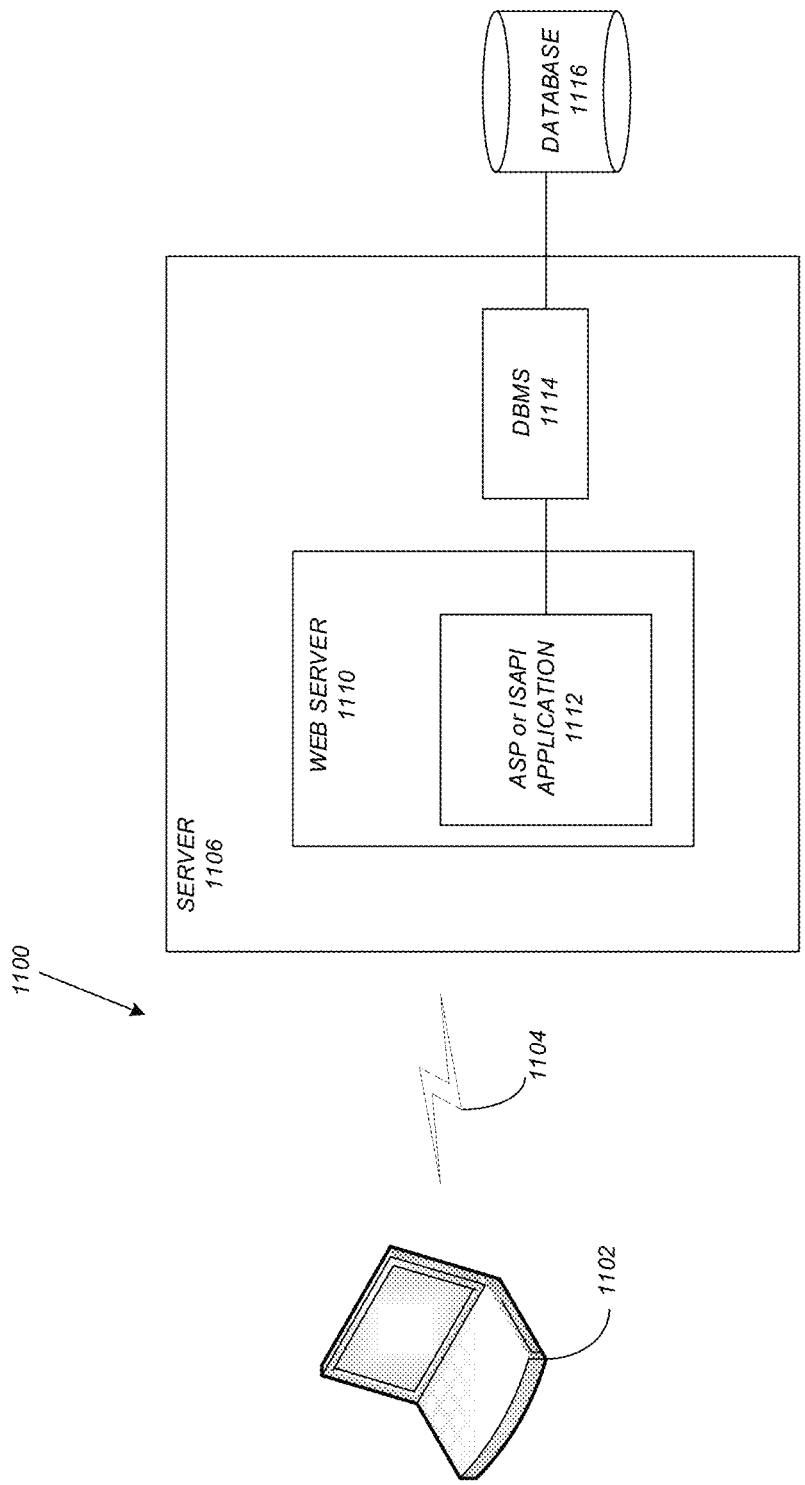
FIG. 11 schematically illustrates a typical distributed/cloud-based computer system using a network to connect client computers to server computers.

FIG. 11 schematically illustrates a typical distributed/cloud-based computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Further, in a cloud-based computing system, resources (e.g., storage, processors, applications, memory, infrastructure, etc.) in clients 1102 and server computers 1106 may be shared by clients 1102, server computers 1106, and users across one or more networks. Resources may be shared by multiple users and can be dynamically reallocated per demand. In this regard, cloud computing may be referred to as a model for enabling access to a shared pool of configurable computing resources.

Clients 1102 may execute a client application or web browser and communicate with server computers 1106 executing web servers 1110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1102 may be downloaded from server computer 1106 to client computers 1102 and installed as a plug-in or ACTIVEX control of a web browser. Accordingly, clients 1102 may utilize ACTIVEX components/component object model (COM) or distributed COM (DCOM) components to provide a user interface on a display of client 1102. The web server 1110 is typically a program such as MICROSOFT'S INTERNET INFORMATION SERVER.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S TRANSACTION SERVER (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented as a software application on a client 1002 or server computer 1006. Further, as described above, the client 1002 or server computer 1006 may comprise a thin client device or a portable device that has a multi-touch-based display. The whole teleportation system 100 (like the physical layer of the current Internet) can be operated under a control plane layer which is directed/orchestrated by the applications layer on top. Based on the needs of the client who interacts with the application layer, the necessary requirements of the application are input to the control plane layer which will appropriately reconfigure various above-mentioned devices involved in the teleportation system 100. When sufficiently efficient quantum transducers (devices which can interconvert from photons to microwaves) are developed, the teleportation systems 100 via interaction with these transducers will help scaling the networks to continental scale, increasing the computing power by inter-connecting different quantum computers.

REFERENCES

The following references are incorporated by reference herein

[1] C. H. Bennett, G. Brassard, C. Crépeau, R. Jozsa, A. Peres, and W. K. Wootters, Teleporting an unknown quantum state via dual classical and Einstein-Podolsky-Rosen channels, Phys. Rev. Lett. 70, 1895 (1993).

[2] D. Bouwmeester, J.-W. Pan, K. Mattle, M. Eibl, H. Weinfurter, and A. Zeilinger, Experimental quantum teleportation, Nature 390, 575 (1997).

[3] D. Boschi, S. Branca, F. De Martini, L. Hardy, and S. Popescu, Experimental Realization of Teleporting an Unknown Pure Quantum State via Dual Classical and Einstein-Podolsky-Rosen Channels, Phys. Rev. Lett. 80, 1112(1998).

[4] A. Furusawa, J. L. Sørensen, S. L. Braunstein, C. A. Fuchs, H. J. Kimble, and E. S. Polzik, Unconditional Quantum Teleportation, Science 282, 706 (1998).

[5] B. Hensen, H. Bernien, A. E. Dréau, A. Reiserer, N. Kalb, M. S. Blok, J. Ruitenberg, R. F. L. Vermeulen, R. N. Schouten, C. Abellán, W. Amaya, V. Pruneri, M. W. Mitchell, M. Markham, D. J. Twitchen, D. Elkouss, S. Wehner, T. H. Taminiau, and R. Hanson, Loophole-free Bell inequality violation using electron spins separated by 13 kilometres, Nature 526, 682 (2015).

[6] L. K. Shalm et al., Strong Loophole-Free Test of Local Realism, Phys. Rev. Lett. 115, 250402 (2015).

[7] M. Giustina et al., Significant-Loophole-Free Test of Bell's Theorem with Entangled Photons, Phys. Rev. Lett. 115, 250401 (2015),

[8] W. Rosenfeld, D. Burchardt, R. Garthoff, K. Redeker, N. Ortegel, M. Rau, and H. Weinfurter, Event-Ready Bell Test Using Entangled Atoms Simultaneously Closing Detection and Locality Loopholes, Phys. Rev. Lett. 119, 010402 (2017).

[9] P. Gao, D. L. Jafferis, and A. C. Wall, Traversable wormholes via a double trace deformation, J. High Energy Phys. 2017, 151 (2017).

[10] B. Yoshida and N. Y. Yao, Disentangling Scrambling and Decoherence via Quantum Teleportation, Phys. Rev. X 9, 011006(2019)

[11] K. A. Landsman, C. Figgatt, T. Schuster, N. M. Linke, B. Yoshida, N. Y. Yao, and C. Monroe, Verified quantum information scrambling, Nature 567, 61 (2019).

[12] S. Lloyd, L. Maccone, R. Garcia-Patron, V. Giovannetti, Y. Shikano, S. Pirandola, L. A. Rozema, A. Darabi, Y. Soudagar, L. K. Shalm, and A. M. Steinberg, Closed Timelike Curves via Postselection: Theory and Experimental Test of Consistency, Phys. Rev. Lett. 106, 040403 (2011).

[13] M. Aspelmeyer, T. J. Kippenberg, and F. Marquardt, Cavity optomechanics, Rev. Mod. Phys. 86, 1391 (2014).

[14] P.-Y. Hou, Y.-Y. Huang, X.-X. Yuan, X.-Y. Chang, C. Zu, L. He, and L.-M. Duan, Quantum teleportation from light beams to vibrational states of a macroscopic diamond, Nat. Commun. 7, 11736 (2016).

[15] M. A. Nielsen and I. L. Chuang, Quantum Computation and Quantum Information (Cambridge University Press, USA, 2011), 10th ed. [16] T. D. Ladd, F. Jelezko, R. Laflamme, Y. Nakamura, C. Monroe, and J. L. O'Brien, Quantum computers, Nature 464, 45 (2010).

[17] N. Gisin and R. Thew, Quantum communication, Nat. Photonics 1, 165 (2007).

[18] S. Pirandola, J. Eisert, C. Weedbrook, A. Furusawa, and S. L. Braunstein, Advances in quantum teleportation, Nat. Photonics 9, 641(2015).

[19] H.-J. Briegel, W. Dür, J. I. Cirac, and P. Zoller, Quantum Repeaters: The Role of Imperfect Local Operations in Quantum Communication, Phys. Rev. Lett. 81, 5932 (1998).

[20] H. J. Kimble, The quantum internet, Nature 453, 1023 (2008),

[21] C. Simon, Towards a global quantum network, Nat. Photonics 11, 678 (2017).

[22] S. Wehner, D. Elkouss, and R. Hanson, Quantum internet: A vision for the road ahead, Science 362, eaam9288 (2018).

[23] N. Sangouard, C. Simon, H. De Riedmatten, and N. Gisin, Quantum repeaters based on atomic ensembles and linear optics, Rev. Mod. Phys. 83, 33 (2011).

[24] J. Dias and T. C. Ralph, Quantum repeaters using continuous-variable teleportation, Phys. Rev. A 95, 022312 (2017).

[25] M. Lucamarini, Z. L. Yuan, J. F. Dynes, and A. J. Shields, Overcoming the rate-distance limit of quantum key distribution without quantum repeaters, Nature 557, 400 (2018).

[26] M. K. Bhaskar, R. Riedinger, B. Machielse, D. S. Levonian, C. T. Nguyen, E. N. Knall, H. Park, D. Englund, M. Lončar, D. D. Sukachev, and M. D. Lukin, Experimental demonstration of memory-enhanced quantum communication, Nature 580, 60 (2020).

[27] X.-X. Xia, Q.-C. Sun, Q. Zhang, and J.-W. Pan, Long distance quantum teleportation, Quantum Sci. Technol. 3, 014012 (2017).

[28] X.-S. Ma, T. Herbst, T. Scheidl, D. Wang, S. Kropatschek, W. Naylor, B. Wittmann, A. Mech, J. Kofler, E. Anisimova, et al., Quantum teleportation over 143 kilometres using active feed-forward, Nature 489, 269 (2012).

[29] T. Herbst, T. Scheidl, M. Fink, J. Handsteiner, B. Wittmann, R. Ursin, and A. Zeilinger, Teleportation of entanglement over 143 km, Proc. Natl. Acad. Sci. 112, 14202 (2015).

[30] J. Yin, J.-G. Ren, H. Lu, Y. Cao, H.-L. Yong, Y.-P. Wu, C. Liu, S.-K. Liao, F. Zhou, Y. Jiang, et al., Quantum teleportation and entanglement distribution over 100-kilometre free-space channels, Nature 488,185 (2012).

[31] J.-G. Ren, P. Xu, H.-L. Yong, L. Zhang, S.-K. Liao, J. Yin, W.-Y. Liu, W.-Q. Cai, M. Yang, L. Li, et al., Ground-tosatellite quantum teleportation, Nature 549, 70 (2017).

[32] J. Brendel, N. Gisin, W. Tittel, and H. Zbinden, Pulsed Energy-Time Entangled Twin-Photon Source for Quantum Communication, Phys. Rev. Lett. 82, 2594 (1999).

[33] R. Valivarthi, M. G. Puigibert, Q. Zhou, G. H. Aguilar, V. B. Verma, F. Marsili, M. D. Shaw, S. W. Nam, D. Oblak, and W. Tittel, Quantum teleportation across a metropolitan fibre network, Nat. Photonics 10, 676 (2016).

[34] Q.-C. Sun, Y.-L. Mao, S.-J. Chen, W. Zhang, Y.-F. Jiang, Y.-B. Zhang, W.-J. Zhang, S. Miki, T. Yamashita, H. Terai, X. Jiang, T.-Y. Chen, L.-X. You, X.-F. Chen, Z. Wang, J.-Y. Fan, Q. Zhang, and J.-W. Pan, Quantum teleportation with independent sources and prior entanglement distribution over a network, Nat. Photonics 10, 671(2016).

[35] H. Takesue and B. Miquel, Entanglement swapping using telecom-band photons generated in fibers, Opt. Express 17, 10748 (2009).

[36] S.-K. Liao, Long-distance free-space quantum key distribution in daylight towards inter-satellite communication, Nat. Photonics 11, 509 (2017).

[37] A. I. Lvovsky, B. C. Sanders, and W. Tittel, Optical quantum memory, Nat. Photonics 3, 706(2009).

[38] N. Lauk, N. Sinclair, S. Barzanjeh, J. P. Covey, M. Saffman, M. Spiropulu, and C. Simon, Perspectives on quantum transduction, Quantum Sci. Technol. 5, 020501 (2020).

[39] N. J. Lambert, A. Rueda, F. Sedlmeir, and H. G. Schwefel, Coherent Conversion Between Microwave and Optical Photons—An Overview of Physical Implementations, Adv. Quantum Technol. 3, 1900077 (2020).

[40] V. B. Braginsky and F. Y. Khalili, Quantum nondemolition measurements: the route from toys to tools, Rev. Mod. Phys. 68, 1 (1996).

[41] I. Marcikic, H. De Riedmatten, W. Tittel, H. Zbinden, and N. Gisin, Long-distance teleportation of qubits at telecommunication wavelengths, Nature 421, 509(2003).

[42] H. De Riedmatten, I. Marcikic, W. Tittel, H. Zbinden, D. Collins, and N. Gisin, Long Distance Quantum Teleportation in a Quantum Relay Configuration, Phys. Rev. Lett. 92, 047904 (2004).

[43] H. Takesue, S. D. Dyer, M. J. Stevens, V. Verma, R. P. Mirin, and S. W. Nam, Quantum teleportation over 100 km of fiber using highly efficient superconducting nanowire single-photon detectors, Optica 2, 832 (2015).

[44] O. Landry, J. A. W. van Houwelingen, A. Beveratos, H. Zbinden, and N. Gisin, Quantum teleportation over the Swisscom telecommunication network, JOSA B 24, 398 (2007).

[45] M. Halder, A. Beveratos, N. Gisin, V. Scarani, C. Simon, and H. Zbinden, Entangling independent photons by time measurement, Nat. Phys. 3, 692 (2007).

[46] F. Bussières, C. Clausen, A. Tiranov, B. Korzh, V. B. Verma, S. W. Nam, F. Marsili, A. Ferrier, P. Goldner, H. Herrmann, C. Silberhorn, W. Sohler, M. Afzelius, and N. Gisin, Quantum teleportation from a telecom-wavelength photon to a solid-state quantum memory, Nat. Photonics 8, 775(2014)

[47] P. Gao and D. L. Jafferis, A Traversable Wormhole Teleportation Protocol in the SYK Model, arXiv: 1911.07416 [hep-th] (2019).

[48] E. Miyazono, T. Zhong, I. Craiciu, J. M. Kindem, and A. Faraon, Coupling of erbium dopants to yttrium orthosilicate photonic crystal cavities for on-chip optical quantum memories, Appl. Phys. Lett. 108, 011111 (2016).

[49] B. Lauritzen, J. Minár, H. De Riedmatten, M. Afzelius, N. Sangouard, C. Simon, and N. Gisin, Telecommunication Wavelength Solid-State Memory at the Single Photon Level, Phys. Rev. Lett. 104, 080502 (2010).

[50] S. Welinski, P. J. T. Woodburn, N. Lauk, R. L. Cone, C. Simon, P. Goldner, and C. W. Thiel, Electron Spin Coherence in Optically Excited States of Rare-Earth Ions for Microwave to Optical Quantum Transducers, Phys. Rev. Lett. 122, 247401 (2019).

[51] C. K. Hong, Z. Y. Ou, and L. Mandel, Measurement of subpicosecond time intervals between two photons by interference, Phys. Rev. Lett. 59, 2044 (1987).

[52] J. B. Altepeter, E. R. Jeffrey, and P. G. Kwiat, Photonic State Tomography, Adv. At., Mol., Opt. Phys. 52, 105 (2005).

[53] X. Ma, B. Qi, Y. Zhao, and H.-K. Lo, Practical decoy state for quantum key distribution, Phys. Rev. A 72, 012326 (2005).

[54] G. Iskander, N. Sinclair, C. Peña, S. Xie, and M. Spiropulu, Stabilization of an electro-optic modulator for quantum communication using a low-cost microcontroller, Caltech Undergraduate Res. J. 20 (2019).

[55] J. Rarity, Interference of Single Photons from Separate Sources, Ann. N. Y. Acad. Sci. 755, 624 (1995).

[56] F. Marsili, V. B. Verma, J. A. Stern, S. Harrington, A. E. Lita, T. Gerrits, I. Vayshenker, B. Baek, M. D. Shaw, R. P. Mirin, and S. W. Nam, Detecting single infrared photons with 93% system efficiency, Nat. Photonics 7, 210 (2013).

[57] Photon spot, Sub-Kelvin Cryogenics & Superconducting Nanowire Single-Photon Detectors, https://www.photonspot.com/.

[58] N. Lütkenhaus, J. Calsamiglia, and K.-A. Suominen, Bell measurements for teleportation, Phys. Rev. A 59, 3295 (1999).

[59] I. Marcikic, H. de Riedmatten, W. Tittel, V. Scarani, H. Zbinden, and N. Gisin, Time-bin entangled qubits for quantum communication created by femtosecond pulses, Phys. Rev. A 66, 062308 (2002).

[60] L. Mandel and E. Wolf, Optical Coherence and Quantum Optics, Optical Coherence and Quantum Optics (Cambridge University Press, Cambridge, 1995).

[61] T. Zhong and F. N. Wong, Nonlocal cancellation of dispersion in Franson interferometry, Phys. Rev. A 88, 020103 (2013).

[62] Manuscript in preparation.

[63] R. F. Werner, Quantum states with Einstein-Podolsky-Rosen correlations admitting a hidden-variable model, Phys. Rev. A 40, 4277 (1989).

[64] J. F. Clauser, M. A. Horne, A. Shimony, and R. A. Holt, Proposed Experiment to Test Local Hidden-Variable Theories, Phys. Rev. Lett. 23,880 (1969).

[65] H. Takesue, 1.5 μm band Hong-Ou-Mandel experiment using photon pairs generated in two independent dispersion shifted fibers, Appl. Phys. Lett. 90, 204101 (2007).

[66] S. Massar and S. Popescu, Optimal Extraction of Information from Finite Quantum Ensembles, Phys. Rev. Lett. 74, 1259 (1995).

[67] H. P. Specht, C. Nölleke, A. Reiserer, M. Uphoff, E. Figueroa, S. Ritter, and G. Rempe, A single-atom quantum memory, Nature 473, 190 (2011).

[68] N. Sinclair, E. Saglamyurek, H. Mallahzadeh, J. A. Slater, M. George, R. Ricken, M. P. Hedges, D. Oblak, C. Simon, W. Sohler, and W. Tittel, Spectral Multiplexing for Scalable Quantum Photonics using an Atomic Frequency Comb Quantum Memory and Feed-Forward Control, Phys. Rev. Lett. 113, 053603 (2014).

[69] D. Bruss, A. Ekert, and C. Macchiavello, Optimal Universal Quantum Cloning and State Estimation, Phys. Rev. Lett. 81, 2598(1993).

[70] V. Bužek and M. Hillery, Quantum copying: Beyond the no-cloning theorem, Phys. Rev. A 54, 1844 (1996).

[71] M. Takeoka, R.-B. Jin, and M. Sasaki, Full analysis of multi-photon pair effects in spontaneous parametric down conversion based photonic quantum information processing, New J. Phys. 17, 043030 (2015).

[72] C. Weedbrook, S. Pirandola, R. Garcia-Patrón, N. J. Cerf, T. C. Ralph, J. H. Shapiro, and S. Lloyd, Gaussian quantum information, Rev. Mod. Phys. 84, 621 (2012).

[73] D. Zhu, M. Colangelo, C. Chen, B. A. Korzh, F. N. Wong, M. D. Shaw, and K. K. Berggren, Resolving Photon Numbers Using a Superconducting Nanowire with ImpedanceMatching Taper, Nano Lett. 20, 3858 (2020).

[74] H. Krovi, S. Guha, Z. Dutton, J. A. Slater, C. Simon, and W. Tittel, Practical quantum repeaters with parametric downconversion sources, Appl. Phys. B 122, 52 (2016).

[75] P. J. Mosley, J. S. Lundeen, B. J. Smith, P. Wasylczyk, A. B. U'Ren, C. Silberhorn, and I. A. Walmsley, Heralded Generation of Ultrafast Single Photons in Pure Quantum States, Phys. Rev. Lett. 100, 133601 (2008).

[76] R. M. Rassoul, A. Ivanov, E. Freysz, A. Ducasse, and F. Hache, Second-harmonic generation under phase-velocity and group-velocity mismatch: influence of cascading self-phase and cross-phase modulation, Opt. Lett. 22, 268 (1997).

[77] B. Korzh, Q.-Y. Zhao, J. P. Allmaras, S. Frasca, T. M. Autry, E. A. Bersin, A. D. Beyer, R. M. Briggs, B. Bumble, M. Colangelo, et al., Demonstration of sub-3 ps temporal resolution with a superconducting nanowire single-photon detector, Nat. Photonics 14, 250 (2020).

[78] R. Valivarthi, I. Lucio-Martinez, A. Rubenok, P. Chan, F. Marsili, V. B. Verma, M. D. Shaw, J. A. Stern, J. A. Slater, D. Oblak, S. W. Nam, and W. Tittel, Efficient Bell state analyzer for time-bin qubits with fast-recovery WSi superconducting single photon detectors, Opt. Express 22, 24497 (2014)

[79] R. Valivarthi, Q. Zhou, C. John, F. Marsili, V. B. Verma, M. D. Shaw, S. W. Nam, D. Oblak, and W. Tittel, A costeffective measurement-device-independent quantum key distribution system for quantum networks, Quantum Sci. Technol. 2, 04LT01 (2017).

[80] Q.-C. Sun, Y.-L. Mao, Y.-F. Jiang, Q. Zhao, S.-J. Chen, W. Zhang, W.-J. Zhang, X. Jiang, T.-Y. Chen, L.-X. You, L. Li, Y.-D. Huang, X.-F. Chen, Z. Wang, X. Ma, Q. Zhang, and J.-W. Pan, Entanglement swapping with independent sources over an optical-fiber network, Phys. Rev. A 95, 032306 (2017).

[81] S. L. Braunstein and S. Pirandola, Side-Channel-Free Quantum Key Distribution, Phys. Rev. Lett. 108, 130502 (2012).

[82] D. Gottesman and I. L. Chuang, Demonstrating the viability of universal quantum computation using teleportation and single-qubit operations, Nature 402, 390 (1999).

[83] Teleportation Systems Towards a Quantum Internet. PRX QUANTUM 1, 020317 (2020), https://journals.aps.org/prxquantum/abstract/10.1103/PRXQuantum.1.20317.

[84] R. Valivarthi et al., "Picosecond Synchronization System for Quantum Networks," in *Journal of Lightwave Technology*, 2022, doi: 10.1109/JLT.2022.3194860; https://arxiv.org/pdf/2203.03127.pdf; arXiv:2203.03127 [quantph] (or arXiv:2203.03127v1 [quant-ph] for this version) https://doi.org/10.48550/arXiv.2203.03127

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A quantum teleportation system, comprising:
a transmitter generating first photons;
a source of pairs of entangled photons, each pair comprising a second photon entangled with a third photon;
a coupler electromagnetically coupled to the transmitter and the source of pairs of entangled photons;
a pair of detectors D1 and D2 electromagnetically coupled to the coupler;
a receiver including a detection system comprising a detector D3 detecting the third photons;
an optical fiber connecting the detector D3 and the source of pairs of entangled photons, wherein the detector D3 detects the third photons transmitted along the optical fiber;
a clock distribution system outputting one or more clock signals controlling timing of the first photons, the second photons, and the third photons such that:
the coupler interacts one of the first photons, carrying a first qubit, and one of the second photons, carrying a second qubit, to form an interference;
the pair of detectors D1 and D2 detect the interference used to obtain a Bell State Measurement of a quantum system comprising the first qubit and the second qubit;
the detector D3 detects one of the third photons entangled with the one of the second photons and outputs a signal in response thereto; and
the detection system reads a state of the first qubit using the signal and the Bell State Measurement;
a data acquisition system acquiring arrival times of the first photons and the second photons at the detectors D1 and D2, and the arrival times of the third photons at the detector D3, wherein the arrival times are tagged with reference to the clock signals; and
a computer benchmarking the quantum teleportation system in real time using the arrival times, wherein the benchmarking comprises using a model simulating at least one of teleportation fidelity of the first qubit teleported to the one of the third photons received at the detector D3, or a degree of indistinguishability between the one of the first photons and the one of the second photons, as a function of a mean number of the second photons, wherein the model is calibrated and validated using measurements of the teleportation fidelity and the degree of indistinguishability.

2. The system of claim 1, wherein:
the transmitter generates pulses of electromagnetic radiation each comprising one or more of the first photons,
the system further comprises:
a first attenuator attenuating the pulses of electromagnetic radiation so as to output attenuated pulses each comprising a first mean number of the first photons, the first mean number of the first photons received on the coupler increasing a likelihood the coupler interacts a single one of the first photons with a single one of the second photons to form the interference;
a first filter electromagnetically coupled to the coupler and spectrally filtering the electromagnetic radiation so as to increase indistinguishability between the one of the first photons and the one of the second photons;
one or more second filters electromagnetically coupled to the source of pairs of entangled photons and spectrally filtering the entangled photons;
the first qubit and the second qubit each comprise a time bin qubit comprising a superposition of an early photon with a later arriving photon; and
the source of entangled photons comprises a laser pumping a nonlinear material so as to output the second photons comprising idler photons and the third photons comprising signal photons according to a spontaneous parametric down conversion (SPDC) process.

3. The system of claim 2, wherein the computer uses the benchmarking to output feedback used to optimize at least one of the timing, an intensity of the entangled photons outputted from the source of entangled photons, the spectral filtering of the photons, or an amount of attenuation of the pulses of electromagnetic radiation, so as to achieve the teleportation fidelity greater than 0.90 when the third photons travel a distance of at least 22 kilometers along the optical fiber.

4. The system of claim 1, wherein the benchmarking comprises determining at least one of the teleportation fidelity of the first qubit teleported to the one of the third photons received at D3, the degree of indistinguishability between the one of the first photons and the one of the second photons, or a threefold coincidence photon detection rate of one of the photons being coincidentally detected at each of D1, D2, and D2.

5. The system of claim 1, wherein the coupler comprises a beamsplitter or a linear optical device capable of interfering photons or electromagnetic fields.

6. The system of claim 5, wherein the model calculates a probability of the detectors D1, D2, and D3 receiving one of the first photons, one of the second photons and one of the third photons in a same clock cycle, using a fitting parameter comprising a transmittance representing the amount of indistinguishability.

7. The system of claim 1, wherein:
the first qubit and the second qubit each comprise a time bin qubit comprising a superposition of an early photon with a later arriving photon;
the source of entangled photons comprises a laser pumping a nonlinear material so as to output the one of the second photons comprising an idler photon and the one of the third photons comprising a signal photon according to a spontaneous parametric down conversion (SPDC) process;
the clock signals comprise clock cycles;
the data acquisition system measures the mean number of the second photons by comparing:
a coincidence rate, comprising events wherein the one of the second photons and
the one of the third photons in the one of the pairs of entangled photons are detected in a same one of the clock cycles; and
an accidental rate, comprising events wherein the one of the second photons and
the one of the third photons in the one of the pairs of entangled photons are detected in different clock cycles,
the degree of indistinguishability is measured by performing a Hong-Ou-Mandel experiment observing the interference using the coupler comprising a beamsplitter; and
the teleportation fidelity is measured using an interferometer measuring visibility of interference of the third photon with itself.

8. The system of claim 7, wherein the model computes the teleportation fidelity and the degree of indistinguishability by:
determining a probability $P_{3f}$ of a threefold coincidence detection of one of the photons on each of the detectors D1, D2 and D3:

$$P_{3f} = Tr\{\rho_{AB}(\mathbb{I} - |0\rangle\langle 0|)^{\otimes 3}_{\hat{a}_1,\hat{a}_2,\hat{a}_3}) \otimes (\mathbb{I} - |0\rangle\langle 0|)^{\otimes 3}_{\hat{b}_1,\hat{b}_2,\hat{b}_3}) \otimes (\mathbb{I} - |0\rangle\langle 0|)_{\hat{c}})\}$$

where:
$\hat{a}$ and $\hat{b}$ operators represent modes of the one of the first photons and the one of the second photons, respectively, that are indistinguishable,
$\hat{c}$ represents a mode of the one of the third photons directed on the detector $D_3$, and
$\rho_{AB}=|\alpha\rangle\langle\alpha|\otimes|\Psi_{TMSV}\rangle\langle\Psi_{TMSV}|$ represents a quantum state of the quantum system;
determining the amount of indistinguishability $V_{HOM}(\zeta)=[P_{3f}(0)-P_{3f}(\zeta)]/P_{3f}(0)$
where $\zeta$ is an amount of indistinguishability between the first qubit and the second qubit, such that $\zeta=1$ ($\zeta=0$) corresponds to a case when both the first qubit and the second qubit are perfectly indistinguishable (distinguishable); and
determining the teleportation fidelity $F(\zeta)=P_{3f}(\zeta,\varphi_{max})/[P_{3f}(\zeta,\varphi_{max})+P_{3f}(\zeta,\varphi_{min})]$, where $\varphi_{max}$ ($\varphi_{min}$) is a maximum (minimum) phase added into a path of the one of the second photons, corresponding to a maximum (minimum) rate of the threefold coincidence detection.

9. The system of claim 8, wherein:

$$1. \; P_{3f}(\zeta) = 1 - 2\frac{\exp\left(-\frac{(\mu_A/2)[1 + (1-\zeta^2)\eta_i\mu_B/2]}{1+\eta_i\mu_B/2}\right)}{1+\eta_i\mu_B/2} - \frac{1}{1+\eta_3\mu_B} + \frac{\exp(-\mu_A)}{1+\eta_i\mu_B} - \frac{\exp(-\mu_A)}{1+(1-\eta_3)\eta_i\mu_B + \eta_3\mu_B} + 2\frac{\exp\left(-\frac{(\mu_A/2)[1+(1-\zeta^2)(1-\eta_3)\eta_i\mu_B/2+\eta_3\mu_B]}{1+(1-\eta_3)\eta_i\mu_B/2+\eta_3\mu_B}\right)}{1+(1-\eta_3)\eta_i\mu_B/2+\eta_3\mu_B}$$

where $\eta_i$ and $\eta_s$ are the transmission efficiencies of the second photons and the third photons, respectively, including the detector efficiencies, $\mu_A$ is the mean number of the first photons per time bin, and $\mu_B$ is the mean number of second photons per time bin.

10. The system of claim 9, wherein:
the first qubit comprises a first time bin qubit and the second qubit comprises a second time bin qubit,
the clock signal comprises clock cycles;
the data acquisition system acquires:
a coincidence rate, comprising events wherein the one of the second photons and
the one of the third photons in the one of the pairs of entangled photons are detected in a same one of the clock cycles;
an accidental rate, comprising events wherein the one of the second photons and
the one of the third photons in the one of the pairs of entangled photons are detected in different ones of the clock cycles;
a first detection rate of the second photons; and
a second detection rate of the third photons;
$\eta_i$ is the second detection rate divided by the coincidence rate and $\eta_s$ is the first detection rate divided by the coincidence rate; and
the mean number of the second photons per time bin is the accidental rate divided by the coincidence rate.

11. The system of claim 1, further comprising a display displaying the benchmarking.

12. A method of teleporting using a quantum teleportation system, comprising:
teleporting a first qubit, comprising:
performing a Bell State Measurement of a quantum system, comprising interfering one or more first photons, carrying the first qubit, and one or more second photons, carrying a second qubit, wherein the quantum system comprises one of the first photons and one of the second photons;
detecting one or more third photons, each of the third photons entangled with one of the second photons prior to the interfering;
reading a state of the first qubit using the Bell State Measurement;

acquiring arrival times of the first photons and the second photons at detectors D1, D2 used to perform the Bell State Measurement, and the arrival times of the third photons at the receiver, wherein the arrival times are tagged with reference to clock signals; and benchmarking the quantum teleportation system in real time using the arrival times.

13. The method of claim 12, wherein the benchmarking comprises using a model simulating at least one of teleportation fidelity of the first qubit teleported to the one of the third photons received at the detector D3, or the degree of indistinguishability between the one of the first photons and the one of the second photons, as a function of a mean number of the second photons, wherein the model is calibrated and validated using measurements of the teleportation fidelity and the degree of indistinguishability.

14. A computer implemented system, comprising:
one or more processors; one or more memories; and an application stored in the one or more memories, the application executed by the one or more processors:
benchmarking a quantum teleportation system in real time, the quantum teleportation system:
teleporting a first qubit, comprising:
performing a Bell State Measurement of a quantum system, comprising
interfering one or more first photons, carrying the first qubit, and one or more second photons, carrying a second qubit, wherein the quantum system comprises one of the first photons and one of the second photons;
detecting one or more third photons at a receiver, each of the third photons entangled with one of the second photons prior to the interfering;
reading a state of the first qubit using the Bell State Measurement; wherein:
the benchmarking comprises the application:
receiving arrival times of the first photons and the second photons at detectors D1, D2 used to perform the Bell State Measurement, and the arrival times of the third photons at the receiver, wherein the arrival times are tagged with reference to clock signals; and
using the arrival times to determine at least one of a teleportation fidelity of the first qubit teleported to the one of the third photons received at D3, a degree of indistinguishability between the one of the first photons and the one of the second photons, or a threefold coincidence photon detection rate of one of the photons being coincidentally detected at each of D1, D2, and D2.

15. The system of claim 14, further comprising:
a transmitter generating pulses of electromagnetic radiation each comprising one or more of the first photons,
a first attenuator attenuating the pulses of electromagnetic radiation so as to output attenuated pulses each comprising a first mean number of the first photons, the first mean number of photons received on a coupler increasing a likelihood the coupler interacts a single one of the first photons with a single one of the second photons to form an interference;
a first filter electromagnetically coupled to the coupler and spectrally filtering the electromagnetic radiation so as to increase indistinguishability between the one of the first photons and the one of the second photons;
one or more second filters electromagnetically coupled to a source of pairs of entangled photons (comprising one of the second photons and one of the third photons) and spectrally filtering the entangled photons;

the first qubit and the second qubit each comprise a time bin qubit comprising a superposition of an early photon with a later arriving photon; and
the source of the pairs of the entangled photons comprises a laser pumping a nonlinear material so as to output the second photons comprising idler photons and the third photons comprising signal photons according to a spontaneous parametric down conversion (SPDC) process.

16. The system of claim 15, wherein the coupler comprises a beamsplitter or a linear optical device capable of interfering photons or electromagnetic fields.

17. The system of claim 15, wherein:
the clock signal comprises clock cycles;
a data acquisition system measures a mean number of the second photons by comparing:
a coincidence rate, comprising events wherein the one of the second photons and
the one of the third photons in the pair of entangled photons are detected in a same one of the clock cycles; and
an accidental rate, comprising events wherein the one of the second photons and
the one of the third photons in the entangled pair are detected in different clock cycles,
the degree of indistinguishability is measured by performing a Hong-Ou-Mandel experiment observing the interference using the coupler comprising a beamsplitter; and
the teleportation fidelity is measured using an interferometer measuring visibility of interference of the third photon with itself.

18. The system of claim 14, wherein the benchmarking comprises using a model simulating at least one of teleportation fidelity of the first qubit teleported to the one of the third photons received at the detector D3, or the degree of indistinguishability between the one of the first photons and the one of the second photons, as a function of a mean number of the second photons, wherein the model is calibrated and validated using measurements of the teleportation fidelity and the degree of indistinguishability.

19. The system of claim 18, wherein the model computes the teleportation fidelity and the amount of indistinguishability by:
determining a probability $P_{3f}$ of a threefold coincidence detection of one of the photons on each of the detectors D1, D2 and D3:

$$P_{3f} = Tr\{\rho_{AB}(\mathbb{1} - (|0\rangle\langle 0|)_{\hat{a}_1,\hat{a}_2,\hat{a}_3}^{\otimes 3}) \otimes (\mathbb{1} - (|0\rangle\langle 0|)_{\hat{b}_1,\hat{b}_2,\hat{b}_3}^{\otimes 3}) \otimes (\mathbb{1} - (|0\rangle\langle 0|)_{\hat{c}})\}$$

where:
$\hat{a}$ and $\hat{b}$ operators represent modes of the one of the first photons and the one of the second photons, respectively, that are indistinguishable,
$\hat{c}$ represents a mode of the one of the third photons directed on the detector $D_3$, and
$\rho_{AB} = (|\alpha\rangle\langle\alpha|) \otimes (|\Psi_{TMSV}\rangle\langle\Psi_{TMSV}|)$ represents a quantum state of the quantum system;
determining the amount of indistinguishability $V_{HOM}(\zeta) = [P_{3f}(0) - P_{3f}(\zeta)]/P_{3f}(0)$
where $\zeta$ is an amount of indistinguishability between the first qubit and the second qubit, such that $\zeta=1$ ($\zeta=0$) corresponds to the case when both the first qubit and the second qubit are perfectly indistinguishable (distinguishable); and determining the teleportation fidelity $F(\zeta)=P_{3f}(\zeta,\varphi_{max})/[P_{3f}(\zeta,\varphi_{max})+P_{3f}(\zeta,\varphi_{min})]$, where $\varphi_{max}(\varphi_{min})$ is a maximum (minimum) phase added into a path of the one of the second photons, corresponding to a maximum (minimum) rate of the threefold coincidence detection.

20. The system of claim 19, wherein:

$$P_{3f}(\zeta) = 1 - 2\frac{\exp\left(-\frac{(\mu_A/2)[1+(1-\zeta^2)\eta_i\mu_B/2]}{1+\eta_i\mu_B/2}\right)}{1+\eta_i\mu_B/2} - $$

$$\frac{1}{1+\eta_3\mu_B} + \frac{\exp(-\mu_A)}{1+\eta_i\mu_B} - \frac{\exp(-\mu_A)}{1+(1-\eta_3)\eta_i\mu_B+\eta_3\mu_B} + $$

$$2\frac{\exp\left(-\frac{(\mu_A/2)[1+(1-\zeta^2)(1-\eta_3)\eta_i\mu_B/2+\eta_3\mu_B]}{1+(1-\eta_3)\eta_i\mu_B/2+\eta_3\mu_B}\right)}{1+(1-\eta_3)\eta_i\mu_B/2+\eta_3\mu_B}$$

where $\eta_i$ and $\eta_s$ are the transmission efficiencies of the second photons and the third photons, respectively, including the detector efficiencies, $\mu_A$ is the mean number of the first photons per time bin, and $\mu_B$ is the mean number of second photons per time bin.

* * * * *